United States Patent [19]

Charter et al.

[11] Patent Number: 5,566,643
[45] Date of Patent: Oct. 22, 1996

[54] CONTROL OF SHARKS

[75] Inventors: Graeme E. Charter, Durban; Sherman H. Ripley, Westville; Norman G. Starkey, Durban, all of South Africa

[73] Assignee: Natal Sharks Board, Natal, South Africa

[21] Appl. No.: 264,813

[22] Filed: Jun. 23, 1994

[30] Foreign Application Priority Data

Jun. 24, 1993 [ZA] South Africa .................... 93/4532

[51] Int. Cl.$^6$ .................................................. A01K 61/00
[52] U.S. Cl. ................................................... 119/220
[58] Field of Search ................................... 119/219, 220

[56] References Cited

U.S. PATENT DOCUMENTS

| | | | |
|---|---|---|---|
| 2,010,601 | 8/1935 | Loughridge ..................... | 119/220 |
| 3,164,772 | 1/1965 | Hicks, IV . | |
| 3,683,280 | 8/1972 | Holt . | |
| 3,822,403 | 7/1974 | Coleman et al. . | |
| 4,211,980 | 7/1980 | Stowell ......................... | 119/220 |
| 4,667,431 | 5/1987 | Mendicino . | |
| 4,750,451 | 6/1988 | Smith ............................ | 119/220 |
| 4,825,810 | 5/1989 | Sharber ......................... | 119/220 |

OTHER PUBLICATIONS

Kalmijn, Adrianus J., "The Electric and Magnetic Sense of Sharks, Skates, and Rays," *Oceanus*, vol. 20, No. 3, WHOI, Woods Hole, Summer 1977 Edition, pp. 45–52.

Smith, E. D., "Electro–Physiology of the Electrical Shark–Repellant," The Transactions of the Institute of Electrical Engineers, vol. 65, No. 8, Aug., 1974, pp. 1–20.

Smith, E. D., "Electric Shark–Barrier: Power–Electronics," The Transactions of the SA Institute of Electrical Engineers, Sep., 1990, pp. 38–43.

Smith, E. D., "Planned Introduction of Electric Shark Barriers to Natal," Chondros, vol. 4, No. 1, Mar. 21, 1993, pp. 1–6.

*Primary Examiner*—Robert P. Swiatek
*Attorney, Agent, or Firm*—Brinks Hofer Gilson & Lione

[57] ABSTRACT

A method and apparatus for controlling aquatic animals, particularly sharks. Electrodes are immersed in a body of water and an electric field is created between the electrodes by applying electrical pulses thereto. The pulses may have a duration of between 0.1 and 200 ms, a repetition rate of between 1 and 60 Hz, and a field strength in the body of water at a distance of 1 m of 1 to 10 V.m$^{-1}$ from the electrodes. In a preferred form of the invention, the pulses are generated in pulse trains each comprising a plurality of pulses, with each pulse having a duration of between 0.1 and 3 ms, the pulses in each train being spaced at intervals of between 1 and 30 ms, and the pulse trains being repeated at intervals of between 100 and 1000 ms. In a specific form of the invention, each pulse in such a pulse train has a duration of 2 ms, the pulses in each train are spaced at intervals of 20 ms and the pulse trains are repeated at a frequency of between 2 and 5 Hz.

24 Claims, 18 Drawing Sheets

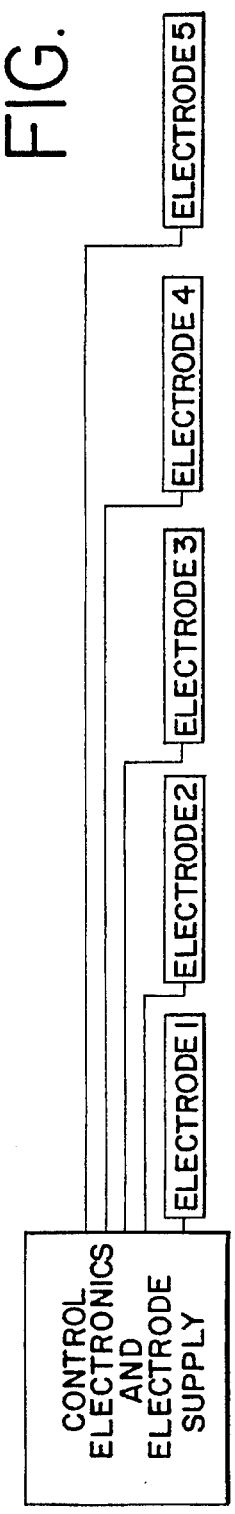
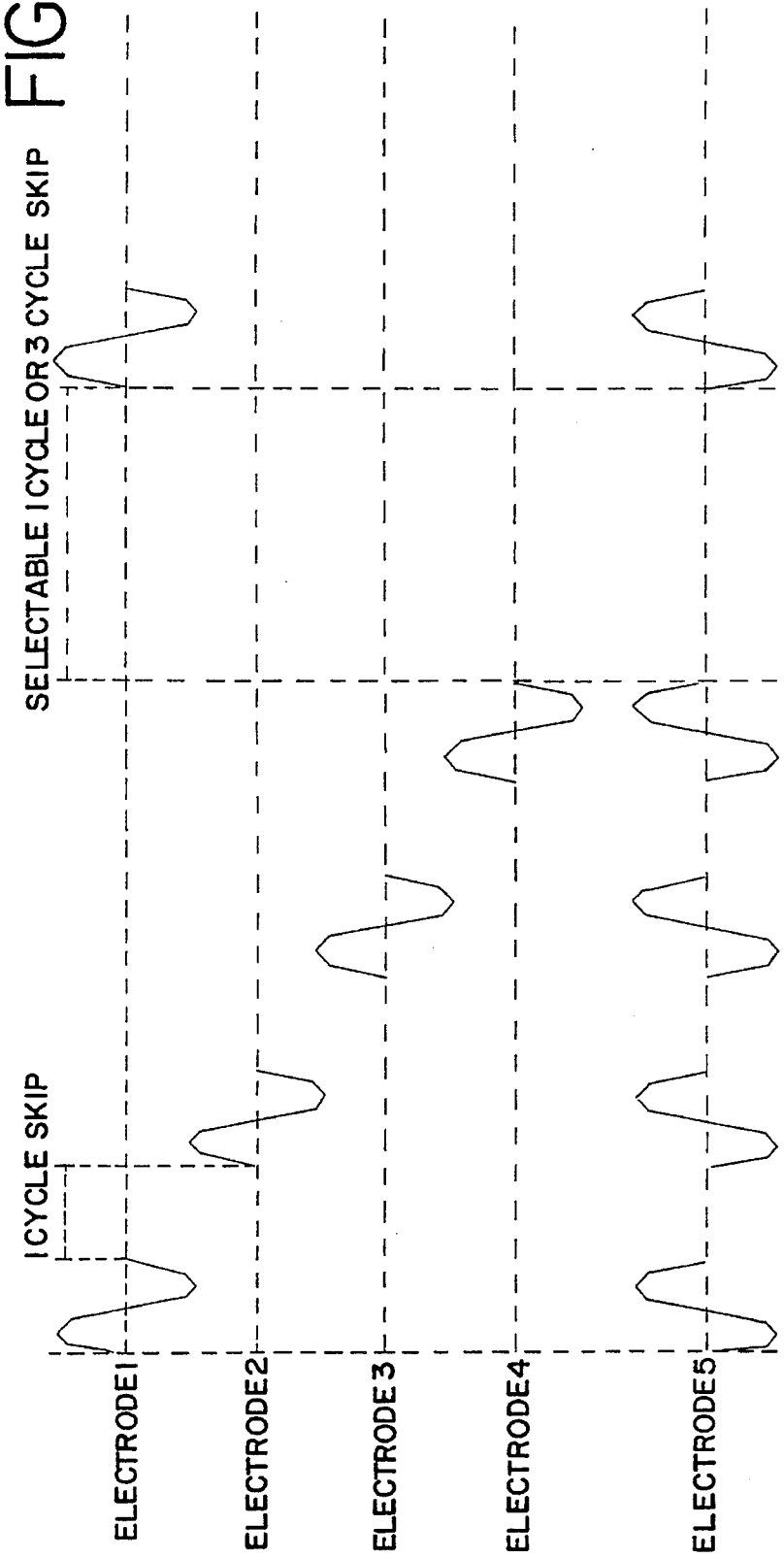

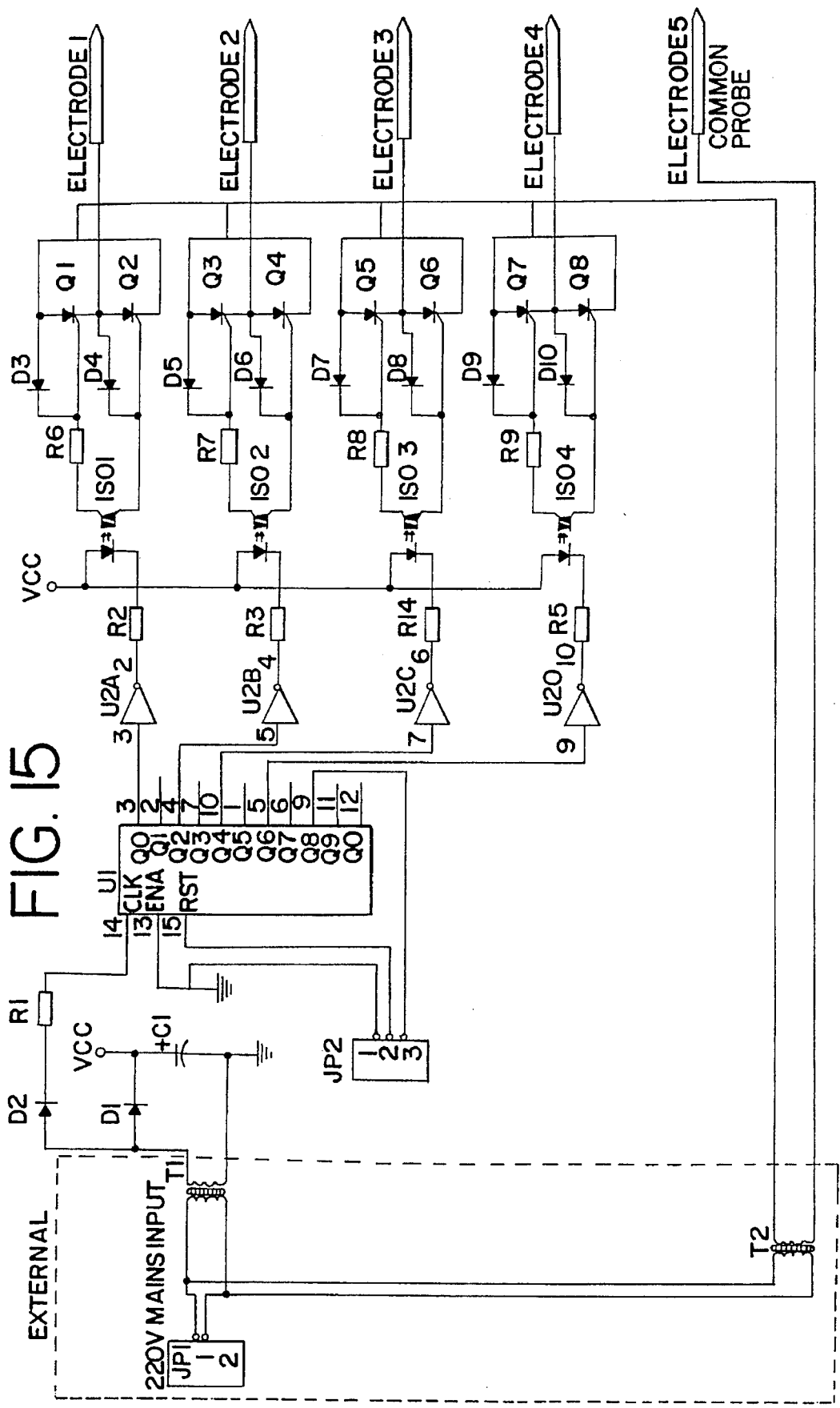

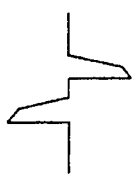
FIG.20 EQUIVALENT WAVEFORM IF PHASE FIRING IS USED TO EXCITE THE BARRIER
FIG.17
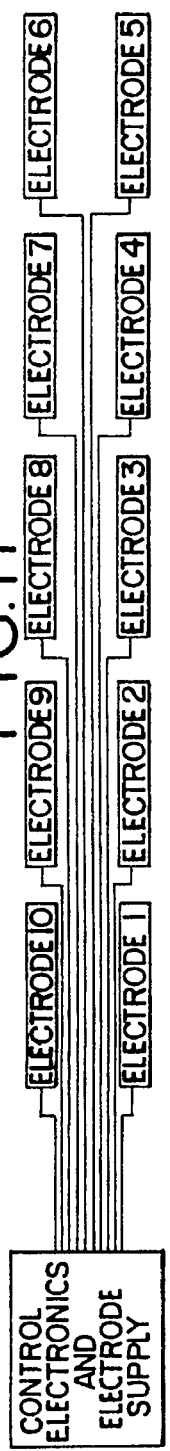
FIG.18
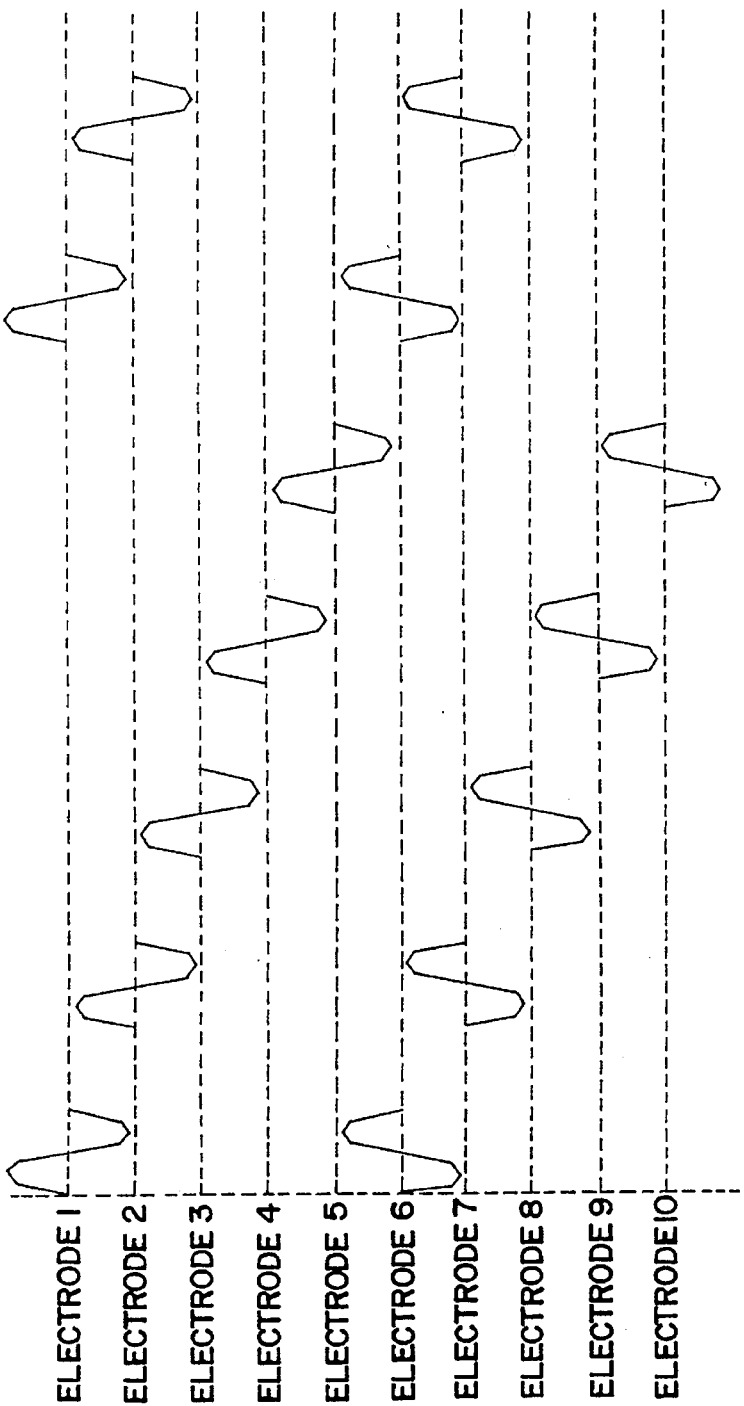

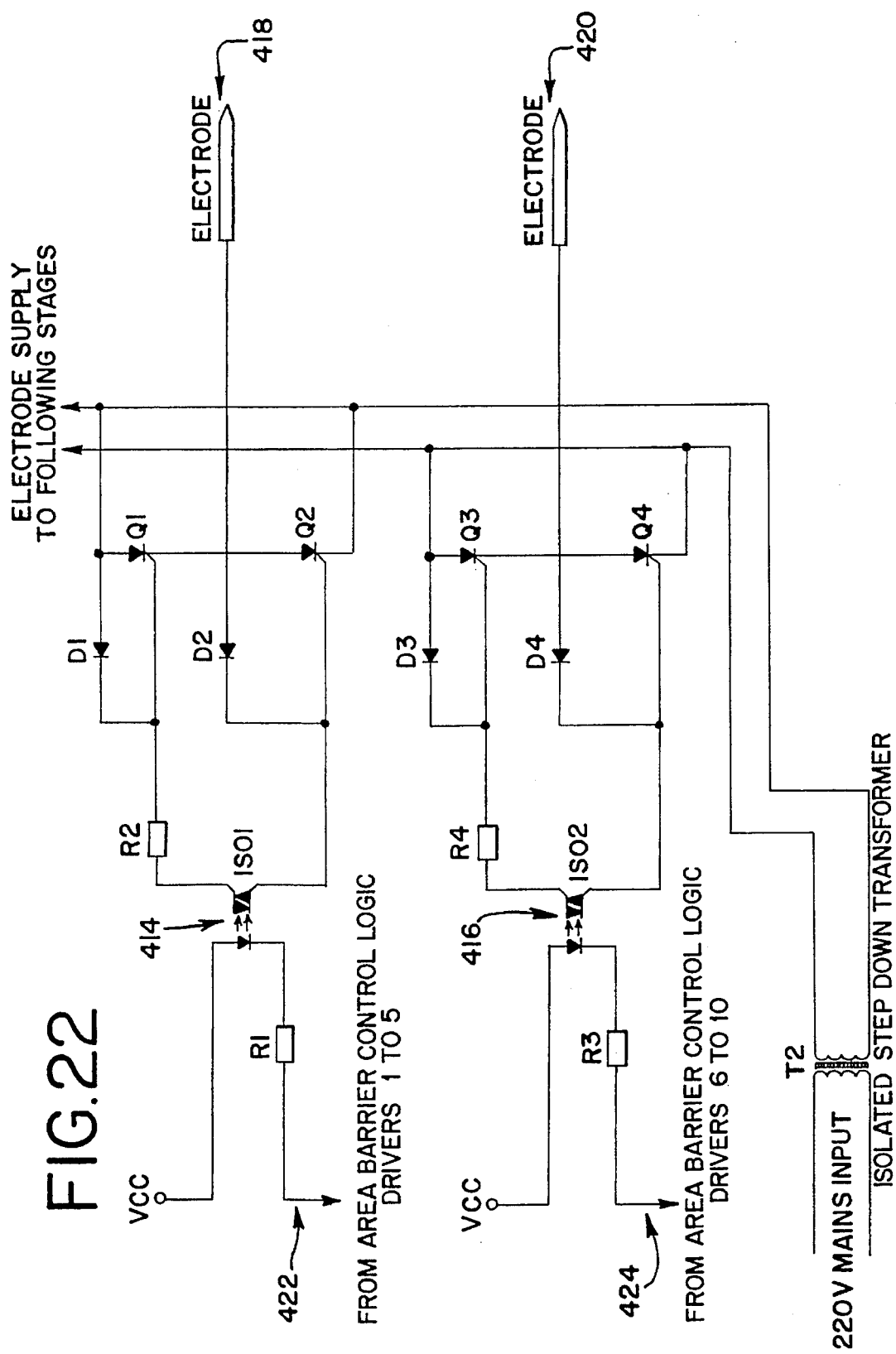

CONTROL OF SHARKS

BACKGROUND TO THE INVENTION

This invention relates to a method of and apparatus for repelling aquatic creatures such as sharks. The invention has particular application in the protection of swimmers or divers from sharks and will be described with reference to such an application by way of example.

Various shark repellant devices have been proposed over the years. A large number of these devices appear to rely on the electro-perception of sharks which is performed by the ampullae of Lorenzini in the shark's nose and head. These sensory organs have been shown, for instance, by Dr. Adrianus J Kalmijn (in research done for the Woods Hole Oceanographic Institution and the U.S. Office of Naval Research), to be extremely sensitive to electrical fields in sea water. Using fields decreasing to 5 nanovolts.cm$^{-1}$ at distances 24 cm to 30 cm from the field source, Kalmijn was able to stimulate feeding attacks in response to electric fields simulating prey. It should be appreciated that this research was conducted against the background that the human body, especially when the skin is damaged, creates substantially stronger bioelectric fields, which some sharks in the ocean can detect from distances up to at least 1 m. The galvanic fields of metallic objects are usually even stronger, which, according to Dr. Kalmijn, could explain much of the aberrant behaviour of sharks in the presence of man and underwater gear.

It is possible, however, that electrical shark deterrents operating on larger field strengths exceed the sensitivity levels of the ampullae of Lorenzini to such an extent that these sensors are of no significance other than possibly to serve as electrical conductors of current. Substantial research will still have to be done in order to confirm these views, but it is clear that electrical deterrents need to rely on involuntary physical effects in order to be reliable and effective.

It appears unlikely that the ampullae of Lorenzini play any direct role in the shark's avoidance and startle reaction. It is possible, however, that these organs play an important passive role. The electrical resistance of living shark skin was measured at a number of places on the shark's body and also in the snout region where the largest number of the jelly-filled canals leading to the ampullae of Lorenzini, exist. It was found that shark's skin has a fairly low electrical resistance, but that on the snout, amidst the canals, the resistance was particularly low, some 5 or more times lower than the skin over the rest of the body. It appears that these low resistance canals may well offer a very low resistance pathway for the entrance of electrons and electrical current. It is felt that this may explain the fact that the shark's nerves are stimulated by aquatic electric fields at much lower electrical voltages than are those of humans.

U.S. Pat. Nos. 3,686,280 (Holt) and 3,164,172 (Hicks), describe shark repelling devices utilising pulse generators producing an electric field to divert sharks from the proximity of the generating apparatus. These early devices are fully traversed by U.S. Pat. Nos. 3,822,403 (Hicks), 4,667,431 (Mendicino) and 4,211,980 (Stowell).

Mendicino describes a device similar to a cattle prod or human crowd control tazor, but unlike these devices which are designed for mammals and which operate on high voltages (up to 40,000 V) and amperages in the mililamp range, the device described by Mendicino provides a 1–5 Amp, 300 V–1000 V charge in an attempt to repel sharks.

Stowell describes a method for repelling sharks by creating, about an electrode submerged in salt water, an electric field with a voltage gradient of sufficient magnitude to "overstimulate" (according to the patent) the nervous system of the shark. He describes a system which applies brief DC pulses to electrodes immersed in salt water with a relatively long delay between pulses (0.5 to 10 ms pulses spaced to a repetition rate of between 6 and 12 Hz).

Of the earlier patents referred to above, Hicks applies current pulses to electrodes to create an electric field between the electrodes at a low frequency of approximately 70 cycles per minute.

All of the devices described above utilise unidirectional current flows with the result that the device is able, in each case, to develop a positively charged region about its cathode. As is apparent from the research of Dr. Kalmijn and others, there is evidence to suggest that such a positively charged region serves as an attractant to sharks.

Like all animals, the shark's nervous system operates on the basis that an increased pulse repetition rate (rather than an increase in the pulse amplitude) is used to transmit intensity of sensation.

The shark's myo-neural physiology imposes a maximum effective nerve impulse frequency which is of the order of 50 Hz. The recovery inertia of the cell appears to prevent impulse frequencies in excess of this rate.

According to E. D. Smith, writing in the *Transactions of the Institute of Electrical Engineers* (volume 65 (8)—August 1974), this recovery or refractory period is of the order of 1 ms and is followed by a period of reduced sensitivity wherein a much increased field strength is required in order to produce a second action potential in the nerve. This leads him to conclude that the nerve fibre stimulation threshold displays a marked dependence on the shape of the stimulating pulse. According to these theories, any externally applied stimulating pulse should rise slowly in intensity with time—It should be semi-sinusoidal in shape. He goes on to suggest a shark repellant device with an optimum pulse (for a Dusky Shark (*Charcharhinus obscurus*)) of approximately 800 µs in duration and a pulse repetition rate of between 1 and 500 Hz.

Smith differentiates between the pulse shapes and rates required to obtain electrotaxis (he attaches a unique interpretation to this term) and to produce a fright reaction in sharks. Smith then goes on to propose a most effective pulse repetition rate for electrotaxis as being:

15 Hz to 16 Hz using 800 µs pulses of semi-sinusoidal shape at field intensities of between 5,5 V.m$^{-1}$ to 10 V.m$^{-1}$.

SUMMARY OF THE INVENTION

According to the invention a method of controlling aquatic animals in a body of water comprises the steps of immersing at least one first and one second electrode in the body of water and creating an electric field between the first and second electrodes by applying electrical pulses thereto, the pulses having a duration of between 0.1 and 200 ms, a repetition rate of between 1 and 60 Hz, and a field strength in the body of water at a distance of 1 m of 1 to 10 V.m$^{-1}$, thereby to repel aquatic animals from the vicinity of the electrodes.

The pulses may conveniently have an amplitude of between 24 and 72 volts.

The rise time of each pulse is preferably less than 0.001 µs.

The polarity of the pulses may be reserved periodically, for example, by switching an output of a DC power supply to the electrodes.

The polarity of the pulses may be reversed after a predetermined number of pulses of each polarity. For example, the polarity of the pulses may be reversed after each pulse, or after several pulses of a given polarity.

If it is the intention to control or repel aquatic animals of the sub-group Elasmobranchii, such as sharks, the pulses may conveniently be generated in pulse trains each comprising a plurality of pulses, with each pulse having a duration of between 0.1 and 3 ms, the pulses in each pulse train being spaced at intervals of between 1 and 30 ms, and the pulse trains being repeated at intervals of between 100 and 1000 ms.

In a preferred version of this embodiment, each pulse in a pulse train has a duration of 2 ms, the pulses in each train being spaced at intervals of 20 ms, and the pulse trains being repeated at a frequency of between 2 and 5 Hz.

The polarity of successive individual pulses in each pulse train may be reversed as defined above, or the polarity of successive pulse trains may be reversed.

A plurality of first and/or second electrodes may be immersed in the body of water in a predetermined configuration, the pulses being applied to selected pairs or groups of electrodes in a predetermined sequence or randomly so that the resulting electrical field is effectively moved about within the body of water in a predetermined or random manner, as the case may be.

Further according to the invention apparatus for controlling aquatic animals in a body of water comprises a power supply, at least one first and one second electrode for immersion in a body of water, first controllable switch means for connecting the electrodes selectively to an output of the power supply in response to control signals and control means arranged to provide control signals to the switch means for the switch means to apply electrical pulses to the electrodes, the pulses having a duration of between 0.1 and 200 ms, a repetition rate of between 1 and 60 Hz, and a field strength in the body of water, at a distance of 1 m of 1 to 10 $V.m^{-1}$, thereby to repel aquatic animals from the vicinity of the electrodes.

The pulses may have an amplitude of between 24 and 72 Volts.

The power supply is preferably a DC power supply.

The apparatus may further include second controllable switch means responsive to polarity control signals from the control means to reverse the polarity of the pulses applied to the electrode periodically.

The apparatus may include current limiting means associated with the first switch means for controlling the current drawn from the power supply in use.

The first and second controllable switch means may comprise solid state switch elements such as transistors, triacs, or the like.

The apparatus may include a plurality of first and/or second electrodes arranged in a predetermined configuration, the control means operating to control the first switch means so that the electrical pulses are applied to selected pairs or groups of electrodes in a predetermined sequence so that the resulting electrical field is effectively moved about within the body of water in a predetermined manner.

Alternatively the control means may operate to control the first switch means so that the electrical pulses are applied to selected pairs or groups of electrodes randomly so that the resulting electrical field is effectively moved about within the body of water in a random manner.

The first and second switch means may be controlled synchronously so that the reverse of the polarity of the pulses occurs simultaneously with the generation thereof.

The apparatus may be portable and may be adapted, for example to be worn by a swimmer or diver, in which case the power supply will be a battery supply.

In the case of portable apparatus, the electrical circuitry is preferably housed in a waterproof casing.

The casing may support a sensor arranged to provide an output when the casing is submerged, the control means being responsive to the output to actuate the apparatus automatically.

The casing may also support a sensor arranged to provide an output when the casing is removed from the water, the control being responsive to the output to deactivate the apparatus automatically on receipt thereof.

If, as has been stated above, the intention is to control or repel aquatic animals of the sub-group Elasmobranchii, such as sharks, the pulses may conveniently be generated in pulse trains each comprising a plurality of pulses, with each pulse having a duration of between 0.1 and 3 ms, the pulses in each train being spaced at intervals of between 1 and 30 ms, and the pulse trains being repeated at intervals of between 100 and 1000 ms.

In a preferred version of the embodiment, each pulse in a pulse train has a duration of 2 ms, the pulses in each train being spaced at intervals of 20 ms, and the pulse trains being repeated at a frequency of between 2 and 5 Hz.

BRIEF DESCRIPTION OF THE DRAWINGS

In the drawings:

FIG. 13 illustrates, diagrammatically, a typical electrode cable configuration for the wide area deterrent device of FIG. 12;

FIG. 14 illustrates the waveform resulting from a particular electrode firing sequence in the wide area deterrent device of FIG. 12 using the cable configuration of FIG. 13;

FIG. 15 is a circuit diagram illustrating, in more detail, a wide area deterrent device according to FIG. 12;

FIG. 17 illustrates, in block diagram form, a preferred electrode wiring configuration for a cable for the device of FIG. 16;

FIG. 18 is waveform diagram illustrating a preferred waveform output by the device of FIG. 16;

FIG. 20 is waveform diagram illustrating a typical waveform output by the device of FIG. 16 using a microcontroller programmed for phase firing;

FIG. 22 is a circuit diagram which illustrates electrode firing circuitry for the devices of FIGS. 16 and 19.

DESCRIPTION OF EMBODIMENTS OF THE INVENTION

It will be appreciated that large nerves in animals, such as sharks, contain many thousands of nerve fibres. Some of these fibres are connected to muscles and, when stimulated, cause the muscles to contract. Others run between sense organs and the animal's brain. If an animal, such as, a shark has one of its large nerves artificially stimulated by a single electric pulse applied, for instance, to the middle of the nerve, it causes a number of events to occur in the animal:

In motor fibres, a nerve impulse goes to the muscle which contracts with a single brief twitch;

In sensory fibres, a nerve impulse goes to the brain where it is appreciated as an unnatural sensation coming apparently from all its sense organs simultaneously;

the muscle twitch itself stimulates sense organs in the muscle which send sensory information to the brain; and the result of these unnatural sensory messages to the brain will, in all probability, startle the shark.

One of the inventors, Dr. Sherman Ripley, in research conducted for applicant concludes that the briefest pulse that excites a nerve is of the order of 30 μs (0.03 ms), but that this requires too high a voltage to be viable. By contrast, the lowest voltage that will excite a nerve requires a pulse duration of approximately 10 ms. Dr. Ripley concludes that the most viable stimulus will have a pulse duration of approximately 0.3 ms to 0.5 ms and then goes on to propose that the optimum stimulus would be short trains of 3 pulses, each of 0.5 ms duration repeated at 20 ms intervals, (ie. 50 Hz) with each 3-pulse train repeated at 200 ms intervals (ie. at 5 Hz).

Figure 1:
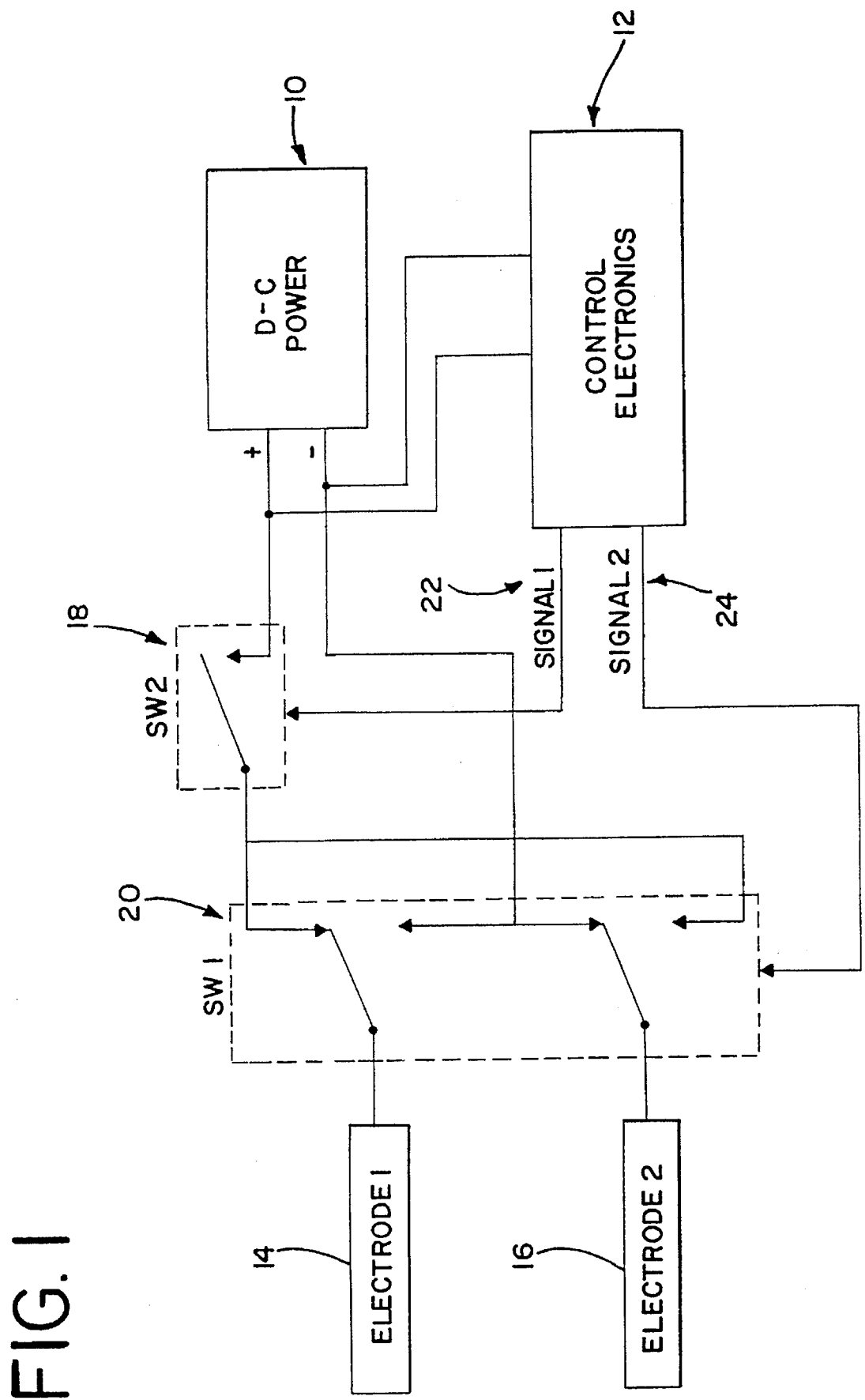
FIG. 1 is a simplified block diagram which illustrates the overall configuration of shark repellant apparatus according to the invention.

The simplified block diagram of FIG. 1 illustrates the overall configuration of the shark repellant apparatus of the invention as applied either to a personal or portable device or to a wide area deterrent device (a device intended to provide protection for an entire bathing area).

A power supply 10 provides both a low voltage DC supply and a higher voltage AC or DC supply. The lower voltage supply is applied to control circuitry 12 and the higher voltage supply is applied to a set of electrodes 14, 16 through a switching circuit 18 and a power switching or electrode driver circuit 20.

The electrodes 14, 16 are immersed in water and an electric field is created between the electrodes 14, 16 when power is switched to the electrode driver circuit 20 and the electrodes 14, 16 by the switching circuit 18 operating under the control of the control circuit 12.

The power supply can be derived from batteries, or may be a DC power supply derived from an AC mains source. In a portable version of the apparatus, the electronic circuitry is housed in an enclosure together with a battery pack.

The pulsed output of the apparatus is commutated by the reversal of the polarity of the electrodes. With the apparatus switched to the settings shown in FIG. 1 and the switching circuit 18 activated (closed), the first electrode 14 will be positive with respect to the second electrode 16 which will be negative. Current will then flow from the first electrode 14 as anode to the second electrode 16 as cathode. Under the control of the control circuit 12, the electrode driver circuit 20 can now be switched to the opposite position with the result that activation of the switching circuit 18 will allow the first electrode 14 to serve as cathode and the second electrode 16 to serve as anode.

By setting the control circuitry 12 to alternate the switch settings of the electrode driver circuit 20 and by synchronously opening and closing the switching circuit 18, a pulsed, alternating current electric field can be set up in the water about the electrodes 14 and 16.

The frequency, pulse erosion and pulse shape characterising the electric field between the electrodes 14 and 16 will be determined by appropriate settings of the control circuitry 12.

Figure 2:
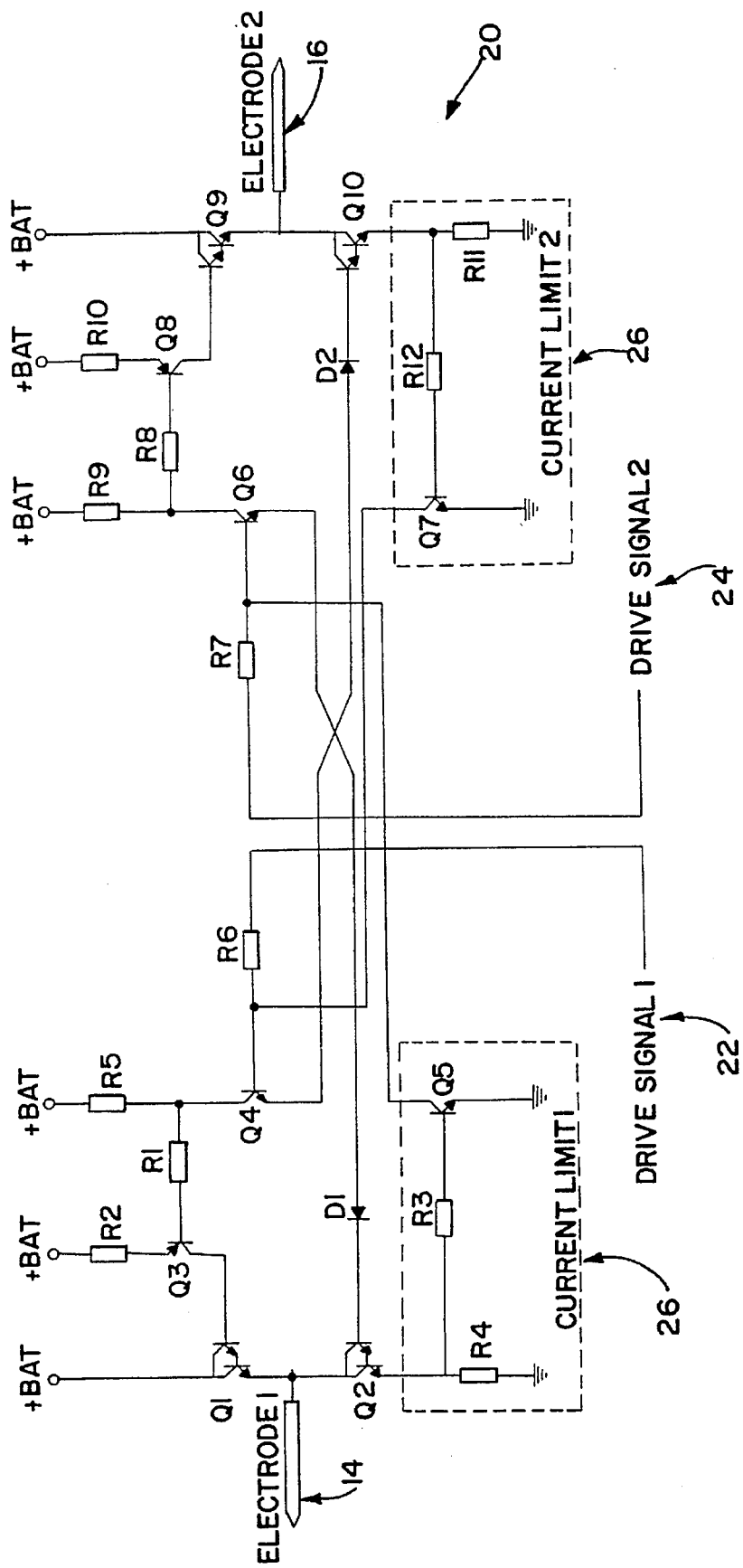
FIG. 2 is a circuit diagram illustrating, diagrammatically, an embodiment of the electrode driver circuit of the apparatus of FIG. 1.

The electrode driver circuit 18 illustrated in FIG. 2 includes a pair of complementary push-pull Darlington output driver stages (Q1 and Q2 at the first electrode 14 and Q9 and Q10 at the second electrode 16).

With no drive signals present at either of drive signal inputs 22 or 24, the drive output transistors Q1, Q2, Q9, Q10 are off. The control circuitry 12 is set to ensure that only one driver signal 22, 24 is high at any one time. When the first drive signal 22 goes high, it will turn on the transistor Q4 which will turn on the driver stages Q1 and Q10 as well as the transistor Q3 thereby causing the first electrode 14 to go positive with respect to the second electrode 16 which becomes negative.

In view of the fact that the device is intended to operate in sea water which has a low resistance to electricity, each electrode 14, 16 is provided with a current limiter circuit 26. This circuit serves to limit current output into the water and to protect the output driver stages Q1, Q2, Q9, Q10.

On commutation of the driver signals by the control circuitry 12, the first drive signal goes off and the second drive signal 24 goes high. This repeats the above procedure for the transistor Q6—which turns on transistors Q2, Q6 and Q9 to switch the second electrode 16 to negative and the first electrode 14 to positive.

Figure 3:
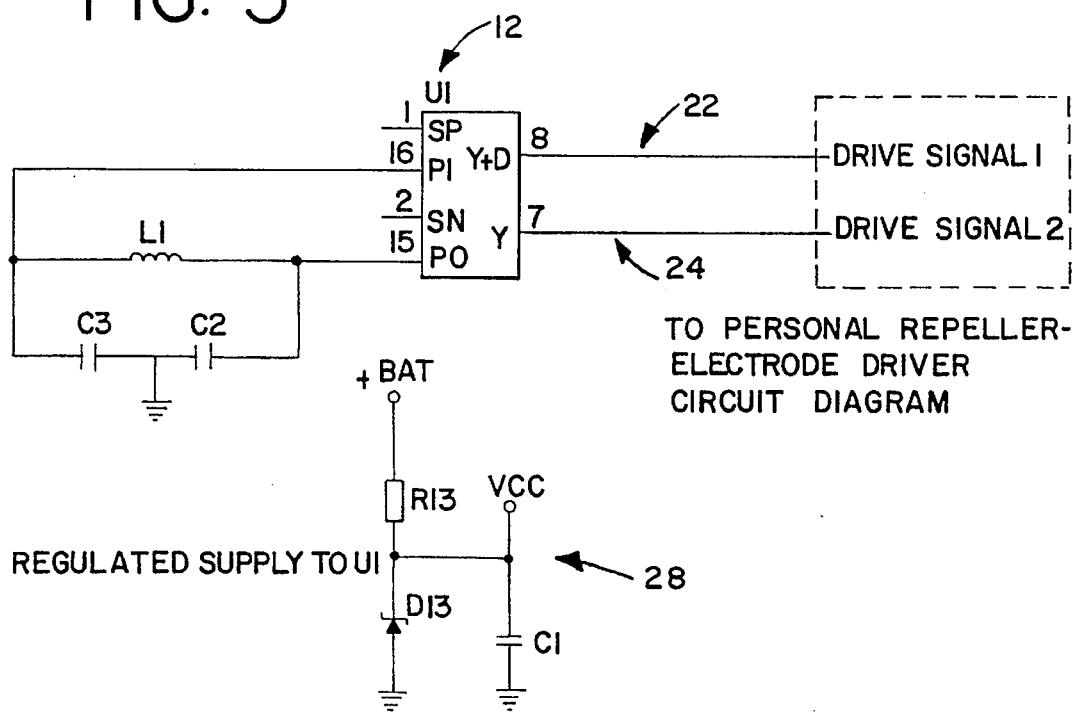
FIG. 3 is a circuit diagram illustrating the control electronics of the apparatus of FIG. 1.

This process is repeated under the control of circuitry 12 which is illustrated in FIG. 3. The control circuitry 12 is centered on an integrated circuit device U1 which comprises an oscillator and a 21-stage counter. Oscillation frequency is determined by an inductor L1 and a pair of capacitors C2 and C3. The device U1 alternately toggles each output Y and Y+D every 21 clock counts for a period of 1 clock count for each to output a signal which is then fed to the electrode driver circuitry 18 as first and second drive signals 22 and 24.

The period of the pulse appearing at Y and Y+D is set internally of the device U1 to 3.125% of the oscillator frequency. This is done by setting the complementary output duty cycle of the device to 3.125% of the duty cycle.

Figure 4:
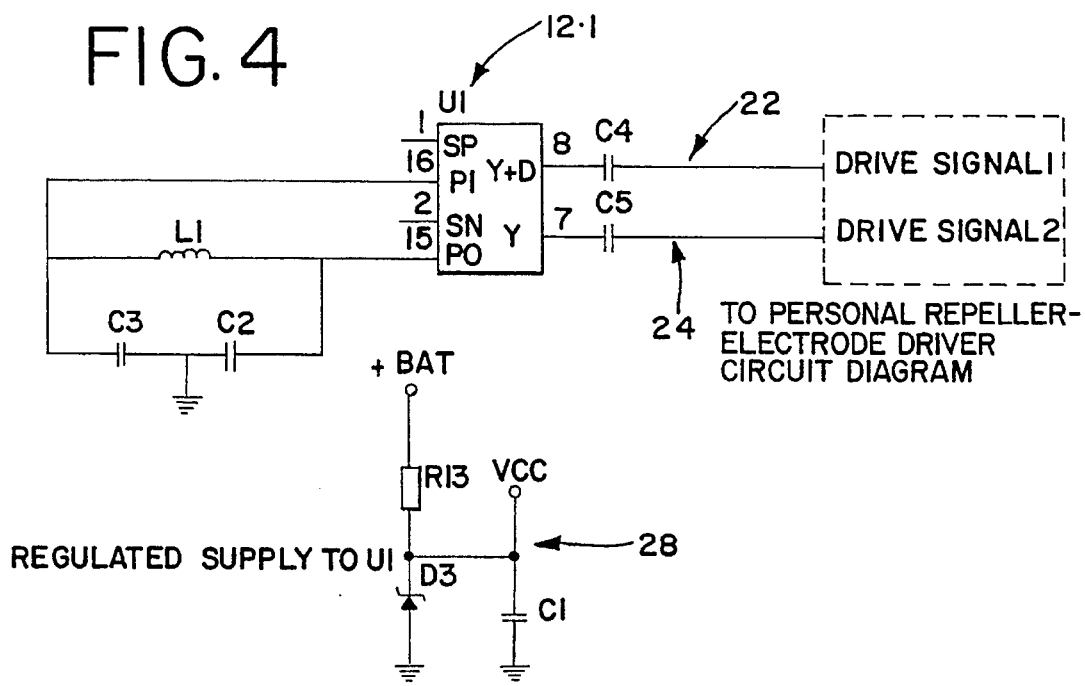
FIG. 4 is a circuit diagram illustrating, with some modification, an embodiment of the control electronics of the apparatus of FIG. 1.

The necessity for power conservation gave rise to the development of alternative control circuitry 12.1 as is illustrated in FIG. 4. In this circuit, a pair of capacitors C4 and C5 are connected in series in the first and second drive signals 22 and 24 outputs respectively. The effect of the capacitors C4 and C5 is to transfer, when driven, maximum energy into their respective drive signal circuits. However, since the capacitor transfer rate decays exponentially with time, a corresponding decrease is caused in the driver signal input to the electrode driver circuits 20. This causes the electrode driver circuits to turn off at a corresponding rate.

The effect of this variation is a reduction in the amount of electrical energy output to the water every time the electrode driver stages are switched on thereby conserving battery life.

Figure 3A:
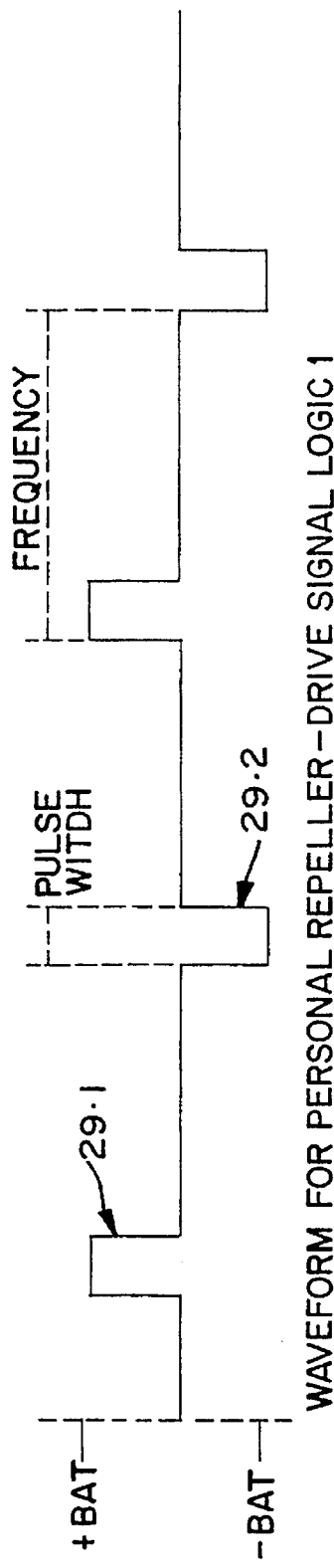
FIG. 3A is a waveform diagram which illustrates the waveform of the electrical output of the apparatus of FIG. 1 configured according to FIG. 3.
Figure 4A:
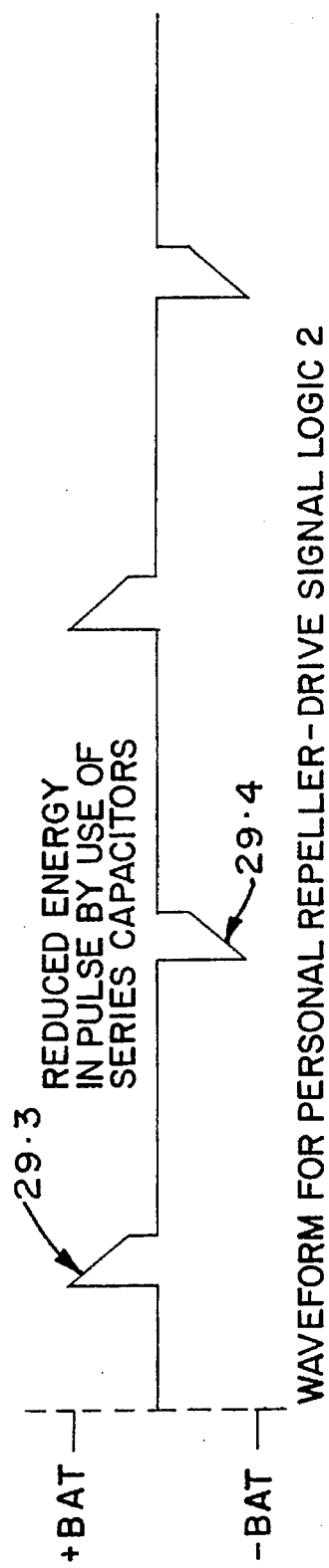
FIG. 4A is a waveform diagram illustrating the waveform of the electrical output of the apparatus of FIG. 1 utilising the control electronics of FIG. 4.

The pulsed electric field output by the apparatus as configured according to FIG. 3 displays essentially the waveform illustrated in FIG. 3A, while the configuration of FIG. 4 displays the waveform of FIG. 4A.

In FIG. 3A it can be seen that a series of essentially square wave pulses 29 are produced at the electrodes 14, 16. Each alternate pulse 29.1 is essentially a positive going pulse (diagrammatically) and each subsequent pulse 29.2 is essentially a negative going pulse. The periodicity of the pulses 29 is determined to comply with the pulse width or duration and pulse frequency requirements set out above.

The waveform illustrated in FIG. 4A is similar to that of FIG. 3A except for the fact the pulses 29.3, 29.4 decay rapidly from the point of switch-on of the electrode to the switch-off point as a result of the use of the series capacitors C4 and C5 illustrated and described with reference to FIG. 4. Once again each alternate pulse 29.3 is essentially a positive going pulse and each subsequent pulse 29.4 is essentially a negative going pulse.

The additional components illustrated in FIGS. 3 and 4 constitute a power supply regulator circuit 28 for the integrated circuit device U1.

Figure 5:
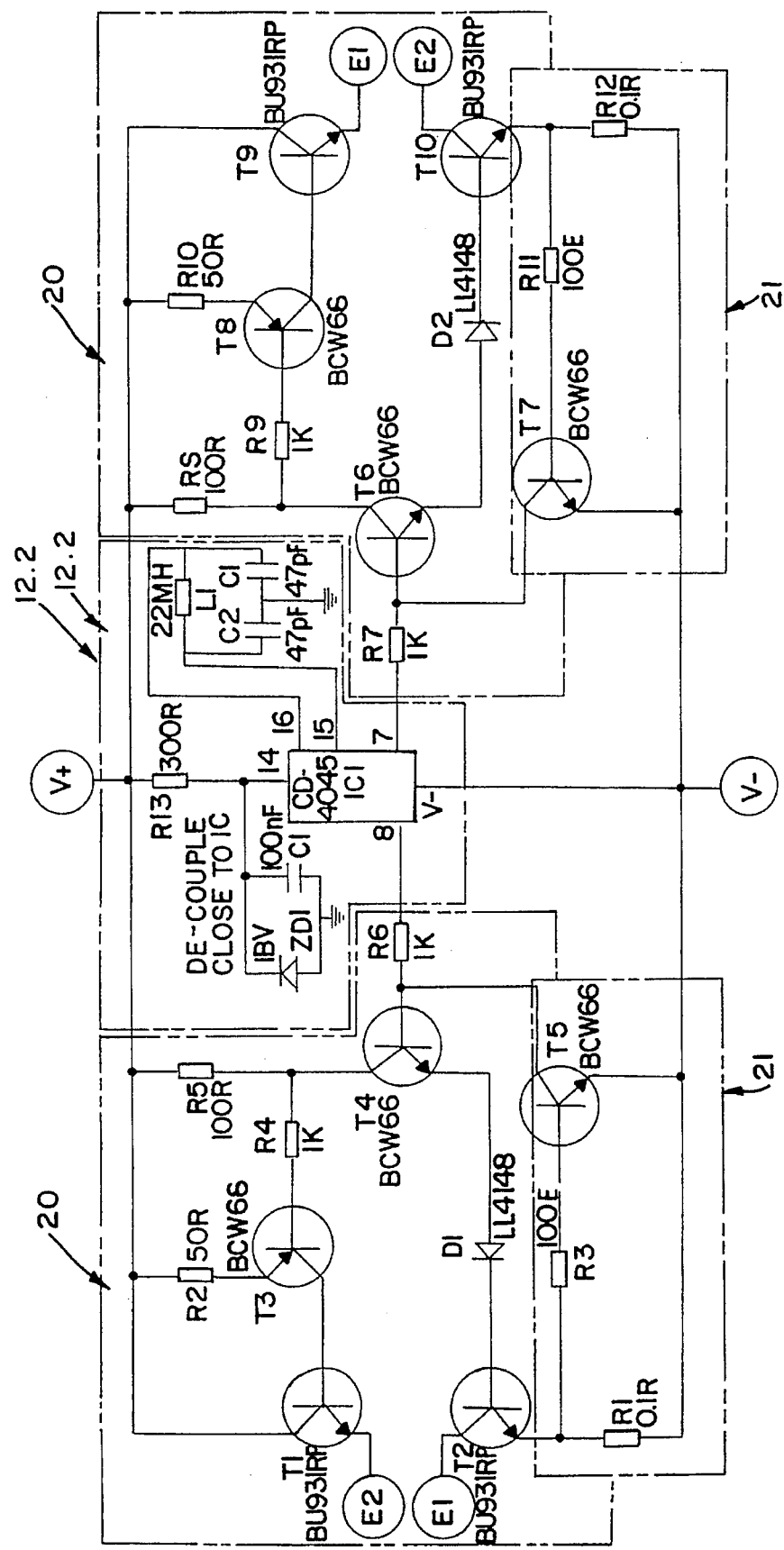
FIG. 5 is a circuit diagram illustrating a substantially complete personal repellant device according to FIG. 1, the control circuitry and drive signal output of which is configured according to FIG. 3.

FIG. 5 illustrates the circuitry of a battery powered portable shark repellant device according to the invention. A portable battery pack is used to provide a 48 V DC output and the electronic circuitry of the portable device is based around a CD4045 integrated circuit (IC) function generator. The CD 4045 IC is set to oscillate at approximately 2 Hz by two capacitors C1 and C2 and an inductor L1. A series resistor R13 and a zener diode ZD1 are arranged to provide a stable operating voltage for the integrated circuit from the battery pack. The output waveform of the oscillator constituted by the CD4045 IC is fed to a pair of common electrodes through driver transistors T4 and T6, which are arranged to drive pairs of power transistors T1, T2, and T9, T10.

Transistors T5 and T7 are connected in a current limiting configuration, and remove the drive from the driver transistors T4 and T6 in the event that the output current of the circuit exceeds a predetermined maximum level, typically 10 Amp. This protects the apparatus in the event of short circuits.

The CD4045 IC constitutes the control circuitry 12.2 of the portable device of FIG. 5 and the control circuitry 12.2 is configured in the manner described with reference to FIG. 3.

Figure 6:
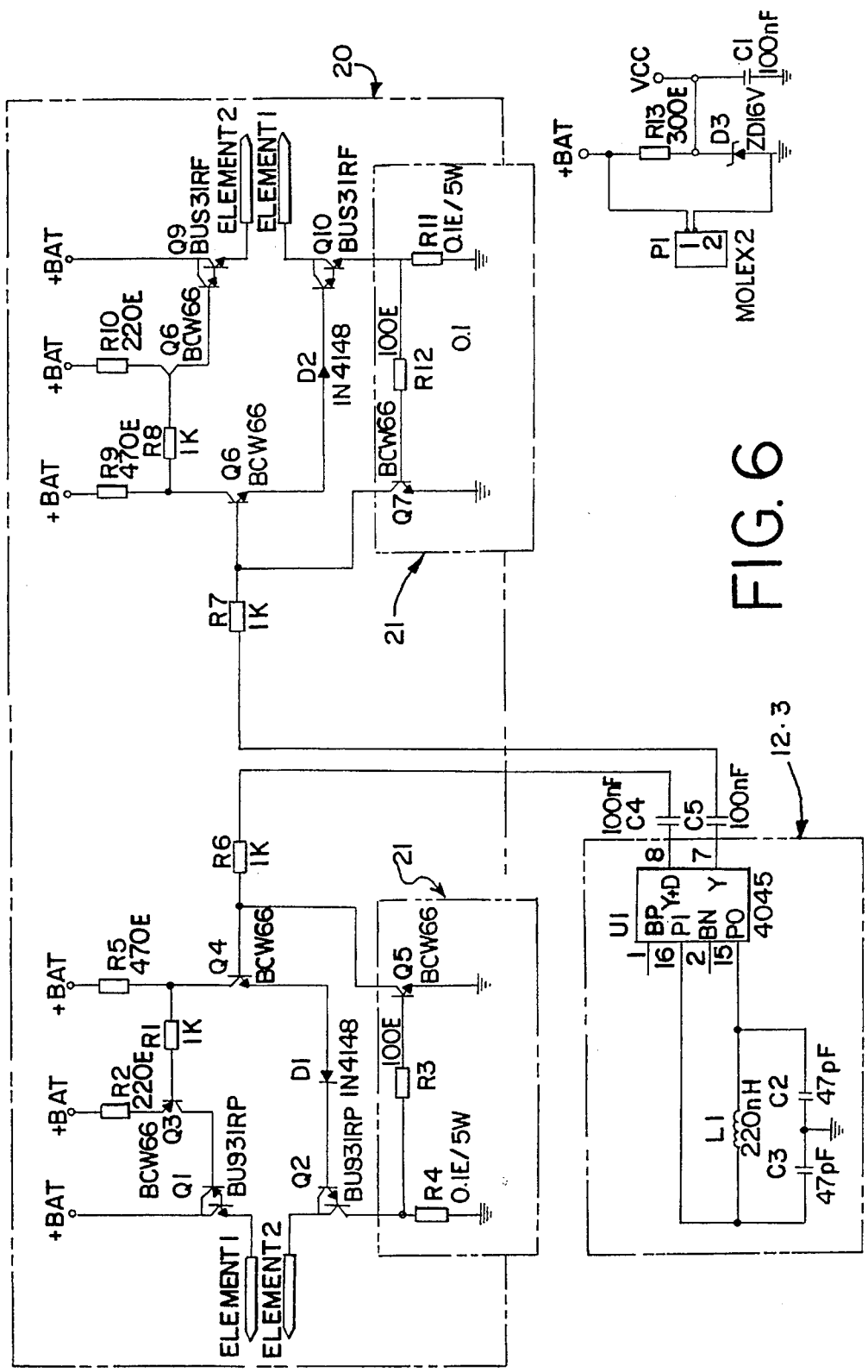
FIG. 6 is a circuit diagram illustrating a substantially complete personal repellant device according to FIG. 1, the control circuitry and drive signal output of which is configured according to FIG. 4.

The device illustrated in FIG. 6 is similar to the battery powered portable shark repellant device shown in FIG. 5. It includes control circuitry 12.3 constituted by an oscillator and drive electronics associated with a 21-stage counter U1 constituted by a CD4045 IC. The CD4046 IC has two complementary output stages Y and Y+D which feed the drive electronics Q1 to Q4, Q6 and Q8 to Q10.

The transistor Q5 with the resistors R3, R4 form a current limiting device 21.3 to protect the electrode drivers Q1, Q2. Likewise, the transistor Q7 with its associated resistors R11 and R12 form a current limiting device 21.4 to protect the electrode drivers Q9, Q10.

The oscillator frequency is determined by an inductor L1 and 2 capacitors C2 and C3. The complementary output duty cycle is set to 3.125% of the duty cycle internally of the CD4045 integrated circuit device U2 and is not variable. The unit is configured to fire only two electrodes at a time and alternates the supply across the electrodes every firing period so that the electrodes are commutated every firing period.

The unit was tested under the following conditions:
the battery supply voltage was set to 48 v DC; and
a 1Ω load was applied over the electrodes to simulate sea water conditions.

Figure 7:
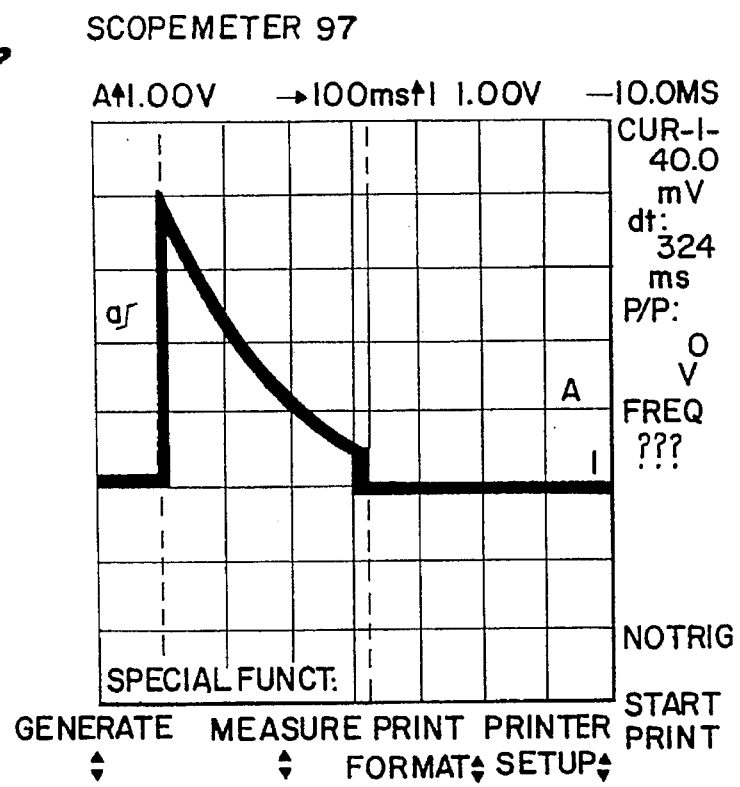
FIG. 7 is a waveform diagram which illustrates the detailed waveform of the electrical output of the apparatus of FIG. 6.

In these tests the unit was found to be firing at a frequency of 1.92 Hz with a pulse width of 32 ms. The unit output is illustrated in the waveform diagrams of FIGS. 7 and 8. In the first waveform diagram (FIG. 7) it can be seen that the waveform peaks at the 4 V graticule and tapers off slowly to about the 0.5 V point. This is due to the use of the series capacitors C4 and C5 situated between the control circuitry 12.3 and the electrode driver circuitry 20.

Figure 8:
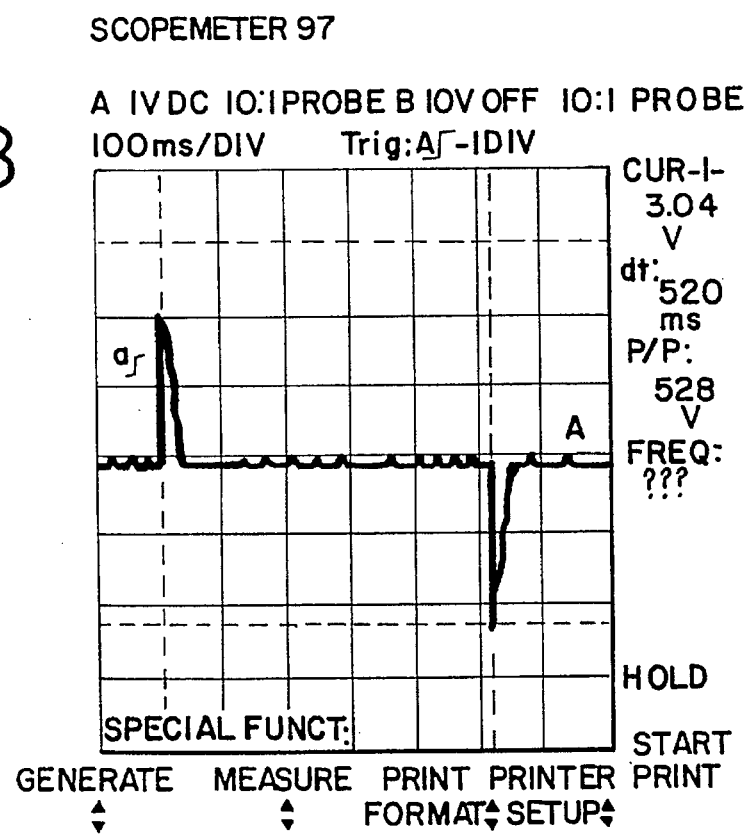
FIG. 8 is a waveform diagram which illustrates the waveform of the electrical output of the apparatus of FIG. 6.

The waveform diagram of FIG. 8 illustrates one complete firing cycle of the unit with the first electrode 14 firing positive with respect to the second and then the commutation of the electrodes with the second electrode 16 then firing positive with respect to the first.

Figure 9:
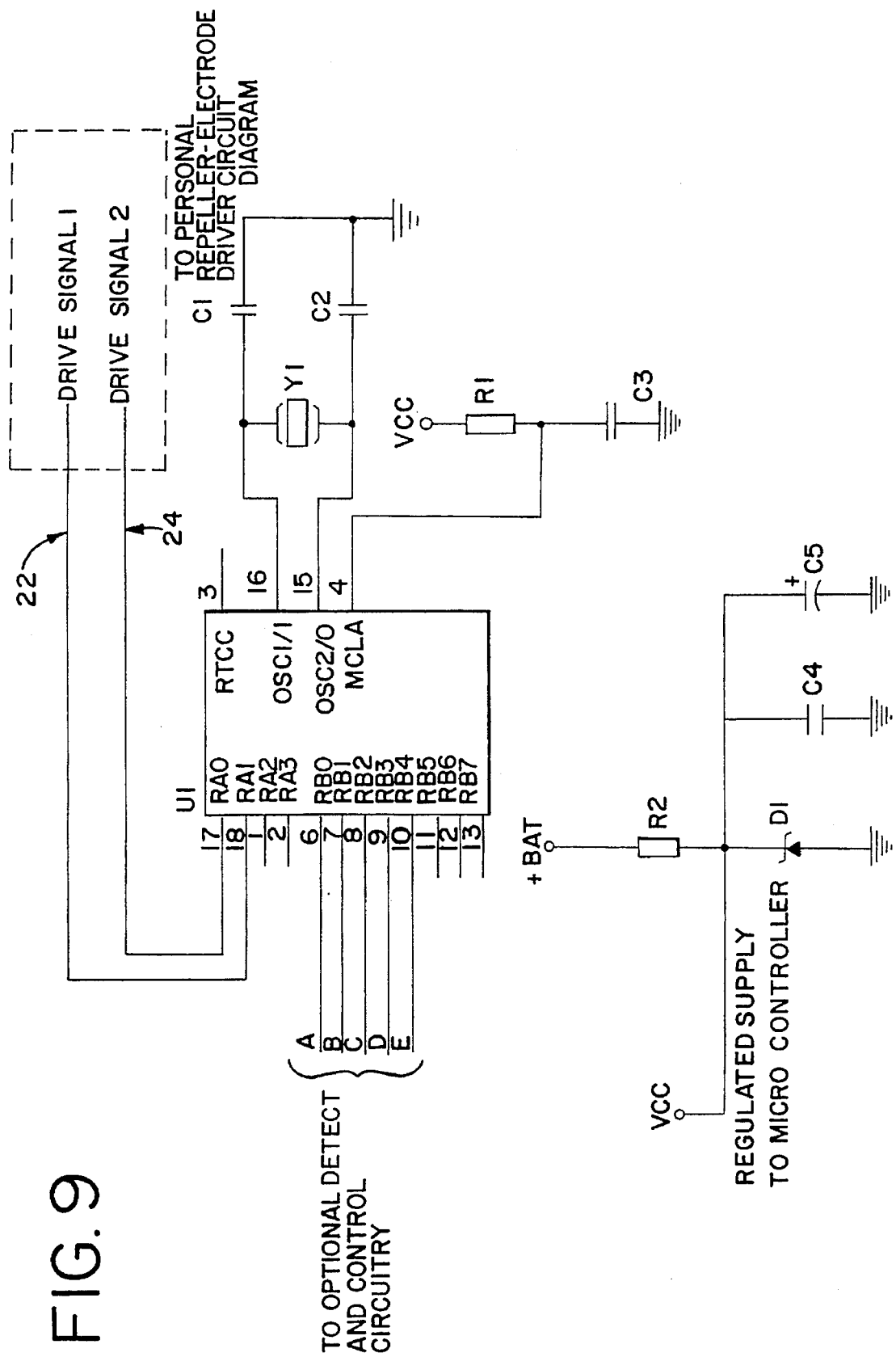
FIG. 9 is a circuit diagram illustrating alternative control circuitry to that illustrated in FIGS. 3 and 4.

In order to produce some of the more complex waveforms required for testing purposes by the applicant, the control circuitry was developed around a programmable integrated circuit device which is illustrated in FIG. 9, where it is denoted by U1. In the control circuitry 12.4 of FIG. 9, the microcontroller U1 is fully programmable around an output frequency determined by the capacitors C1 and C2 and the crystal Y1 which are combined in a clock circuit.

Figure 10:
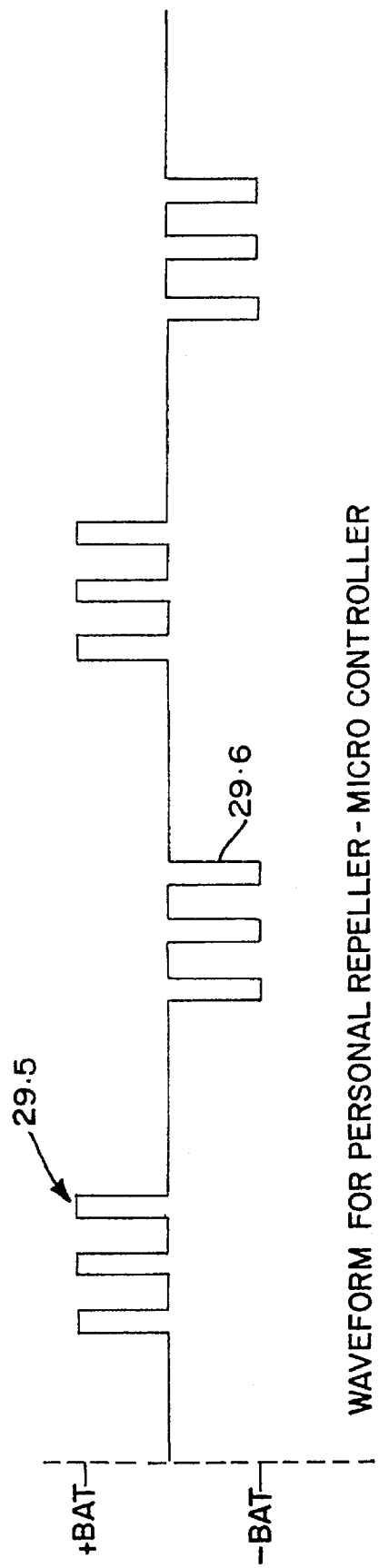
FIG. 10 is waveform diagram illustrating a preferred waveform output by the device of FIG. 9.

During testing, the microcontroller U1 was programmed to output, at the drive signal outputs 22 and 24, a set of driver signals to create, at the electrodes 14 and 16, a pulsed electric field. This pulse configuration, pulse width, pulse frequency and current direction is illustrated in the waveform diagram of FIG. 10.

A series of essentially square wave pulses 29 are produced at the electrodes 14, 16 in pulse trains of three pulses each. Each alternate pulse train 29.5 is essentially a positive going pulse train (diagrammatically) and each subsequent pulse train 29.6 is essentially a negative going pulse train. Each pulse 29 is of 0.5 ms duration and is repeated at 20 ms intervals, (ie 50 Hz) and each 3-pulse train is repeated at 200 ms intervals (ie. at 5 Hz).

The microcontroller U1 is also configured to perform various other functions within the device and, in FIG. 9, pins 6 to 10 of the microcontroller, for instance, have been indicated as being connected to optional detection and control circuitry.

For instance, the optional circuitry can be used to perform battery voltage checks; turn the unit on and off depending on whether or not the unit is immersed in water; and provide battery recharge protection for the components of the device, particularly the control circuitry 12.4.

In FIG. 3A it can be seen that a series of essentially square wave pulses 29 are produced at the electrodes 14, 16. Each alternate pulse 29.1 is essentially a positive going pulse (diagrammatically) and each subsequent pulse 29.2 is essentially a negative going pulse. The periodicity of the pulses 29 is determined to comply with the pulse width or duration and pulse frequency requirements set out above.

Figure 11:
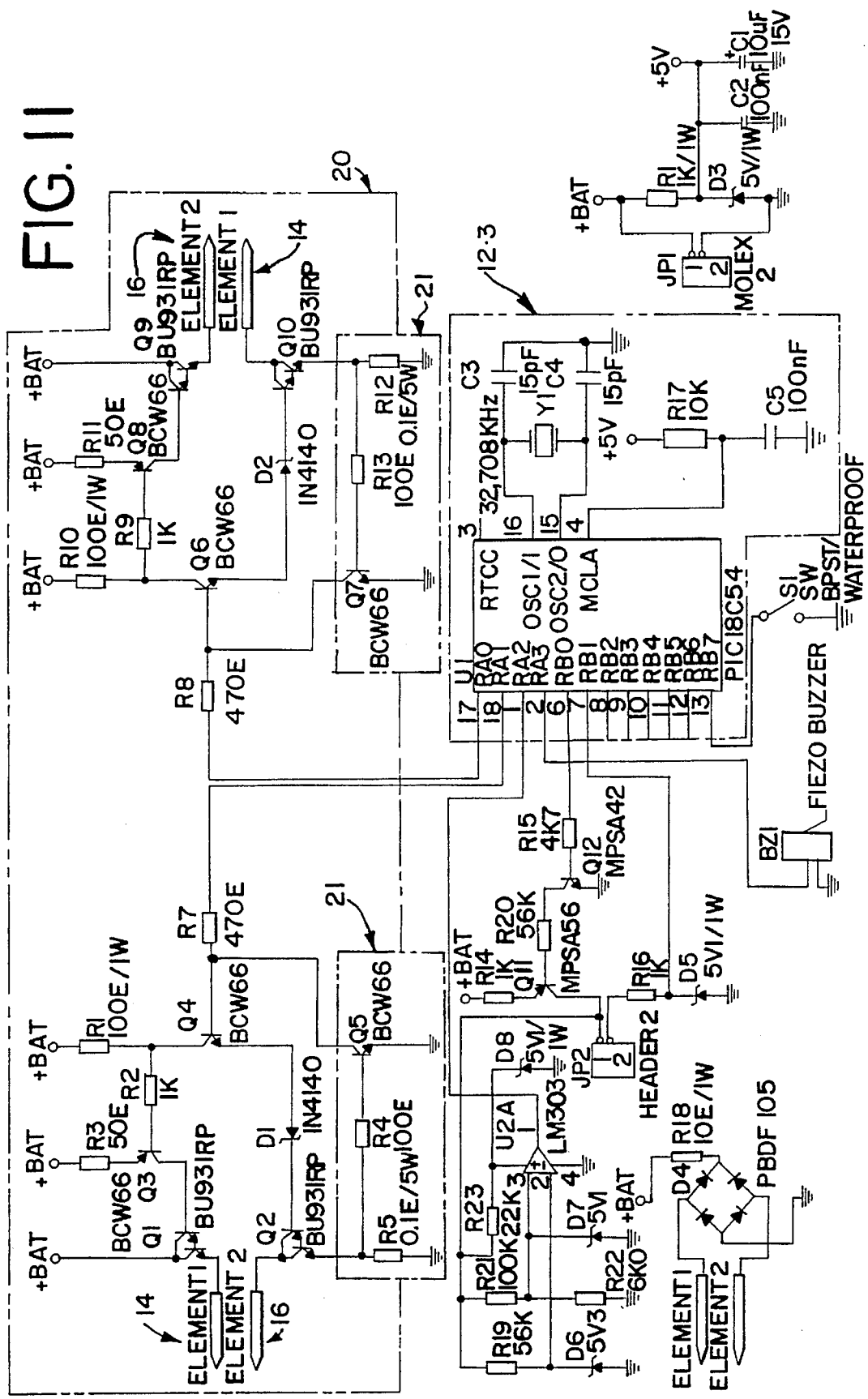
FIG. 11 is a circuit diagram illustrating the control circuitry of FIG. 9 in a substantially complete personal repellant device according to FIG. 1, the control circuitry and drive signal output of which is configured according to FIG. 3.

FIG. 11 illustrates the use of the control circuitry 12.4 of FIG. 9 in a prototype for a portable or personal protection device. The device illustrated here comprises two complementary electrode driver output stages Q1, Q10 and Q2, Q9 to pulse electrical current between a pair of common electrodes 14, 16 as described above.

The driving signals for the driver output stages Q1, Q10 and Q2, Q9 are output by U1, a PIC16C54 microcontroller which generates the drive waveform, frequency and pulse width of the driver signal. Resistors R5 and R12 with their associated components R13, Q7, R4 and Q5 constitute a current limiting section of the output signal to provide overcurrent protection for the final output stage. The resistors R13 and R5 can be constituted by the same resistor.

The power source required for the microcontroller U1 is derived through a zener regulator constituted by the resistor R1, a zener diode D3, and capacitors C2 and C1. A power-up reset signal is provided through the resistor R17 and the capacitor C5 for the microcontroller U1 and the clock source is derived from a 32,768 KHz crystal Y1.

Header 2 (JP2) is constituted by two jumper pins which may be connected to conductors which are open for exposure to the seawater immediately the unit is submerged. Alternatively, the jumper pins can be connected to the electrodes which are in any event exposed to seawater immediately the unit is submerged. The transistor Q11 is periodically pulsed "on" via the transistor Q12 and is intended to test the input signal through the resistor R16 and the zener diode D5, indicating current flow between the jumper pins, this indicates that the exposed parts of the unit are submerged and the microcontroller U1 enters normal operation mode to fire the electrode driver output stages Q1, Q10 and Q2, Q9.

Another alternative would be to install a current sensor in the current limiter circuitry 21 forming part of the electrode driver circuitry 20 and to have the microcontroller poll the current sensor periodically. Current flow would indicate the submersion of the unit in seawater.

The transistor Q11 serves the function of switching in the comparator U2A constituted by an LM393 type integrated circuit which, with its associated input components, resistors R19, R21 and R22 and a zener diode D6, provide the microcontroller U1 at its input RA2 with an indication of the battery state. The threshold battery state is adjustable via the resistors R21 and R22 and must be set above the value of the zener diode D6 in its normal state. If the battery loses charge, the level at the comparator pin 3 will drop below that of the U2A input pin 2 to signal the microcontroller U1 that the battery state is low. The microcontroller U1 will then switch on a piezo buzzer BZ1 to give an audible indication of low battery state.

A diode bridge D4 is connected directly to the electrodes 14 and 16. This allows electrical connection directly to the electrodes to enable recharging of the battery regardless of polarity. A resistor R18 provides overcharging protection for the battery.

An example of a wide area deterrent device is described with reference to FIG. 12. In its simplest form, a wide area deterrent device includes control electronics 110, a power source indicated in FIG. 12 as mains input 112 and electrode driver circuitry 114 which drive a set of electrodes 118. For the sake of convenience, the electrodes are labelled as "electrodes 1 to 5". The electrode firing sequence is controlled by sequencing logic in the control electronics 110 which controls the switch closure of the contacts C1 to C4 forming part of the electrode driver circuitry 114.

With the electrodes 118 immersed in seawater, closure of the contact C1 will result in the creation of an electric field in the seawater between electrode 1 and electrode 5, assuming that electrode 5 will be used as a common electrode. The electrode firing cycle is set to one complete 50 to 60 Hz sine wave, either complete or partial (if phase firing is implemented as is described below).

In a typical firing sequence, a single 50 to 60 Hz sine wave pulse is fed into the seawater load. At the end of a single 50 to 60 Hz sine wave, the contact C1 is opened and, with a one cycle delay, the next contact C2 is closed to create an electric field in the seawater between electrode 2 and the common electrode 5. The contact C2 is opened at the end of a single sine wave cycle and the sequence is repeated for all the other contacts thereby switching current flow repeatedly between the electrodes 1 to 4 and the common electrode 5.

In FIG. 13 a typical electrode cable configuration is illustrated diagrammatically and FIG. 14 illustrates the waveform resulting from the electrode firing sequence described above. The waveform diagram of FIG. 14 shows the single sine wave pulses setting up electric fields alternately between each of the electrodes 1 to 4 and the common electrode 5, each time with a single cycle delay between pulses. Thereafter the cycle repeats itself after a predetermined delay which will depend, to a certain extent, on the number of free microcontroller output pins.

Figure 12:
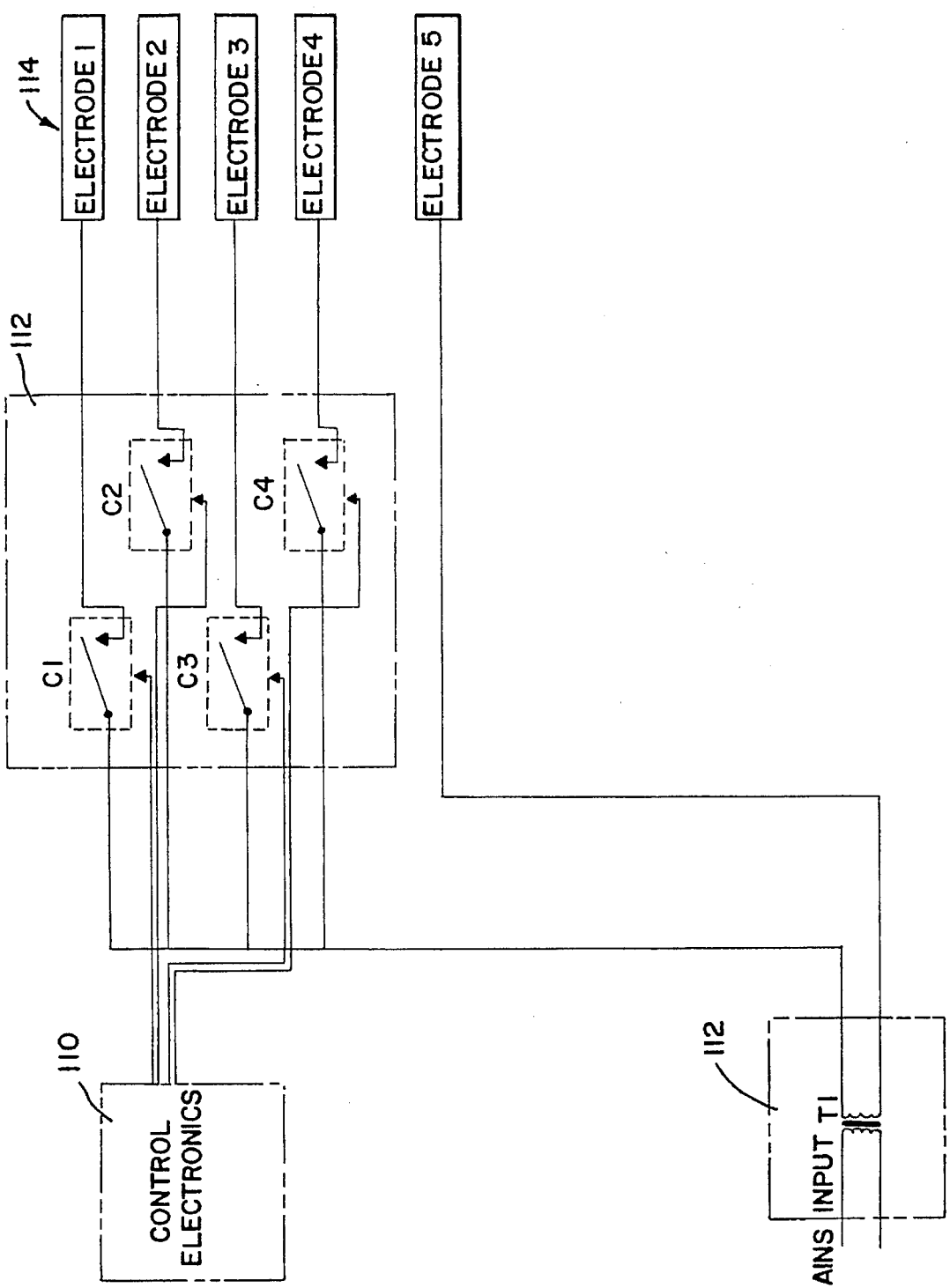
FIG. 12 is a block diagram illustrating, diagrammatically, the circuit requirements for a wide area deterrent device.

A more detailed example of the wide area deterrent device of FIG. 12 is illustrated in the circuit diagram of FIG. 15. In this circuit, an isolation transformer T1 converts 220 V mains current to V in order to drive the electronics and, by means of a diode D2 and resistance R1, provide a signal to a 10-stage ring counter U1, constituted by a 4017-type integrated circuit device. The signal so derived is essentially a mains frequency derived clock signal.

The transformer T2 provides isolation from the mains for the electrode driver circuitry and is variable, either manually or automatically (depending on requirements) to cater for different water conductivities.

Each of the microcontroller outputs Q0 to Q9 of the 4017 device sequentially change from low to high each time the 4017 is clocked (at 50 to 60 Hz) by the mains derived clock signal. When each device output Q0 to Q9 goes high it drives its corresponding electrode driver circuitry across an opto-isolated diac driver (lSO1 to lSO4) to fire its associated SCR and electrode.

The unit is configured to drive 4 active (switched) electrodes and one common electrode (similarly to that described above with reference to FIGS. 12, 13 and 14) arranged in the cable configuration illustrated diagrammatically in FIG. 13. The number of electrodes and the cable length is adjustable in order to cover areas wide enough and render them safe bathing areas. It will be appreciated, however, that additional electrodes will require additional drive circuitry.

Each time the 4017 counter is clocked and drives its associated SCR an electric field is set up in the water between that electrode and the common electrode. This sequence continues through all 4 active electrodes and then repeats. In connecting into the 4017 IC, every second output is used, thereby producing the single cycle delay period between the firing of each SCR and the next which is referred to above.

The number of active electrodes can be 4 or 5 by using the Q8 output of the 4017 IC to drive an extra SCR circuit. As shown, the output Q8 is connected via a jumper JP2 to reset the 4017 and restart the firing sequence with only a single cycle rest period, falling which the 4017 would restart the firing sequence after four cycles, an alternative which is referred to above.

The resultant waveform has been described with reference to FIG. 14, which shows the passage, at each electrode, of a full AC waveform as a single pulse per electrode.

Figure 16:
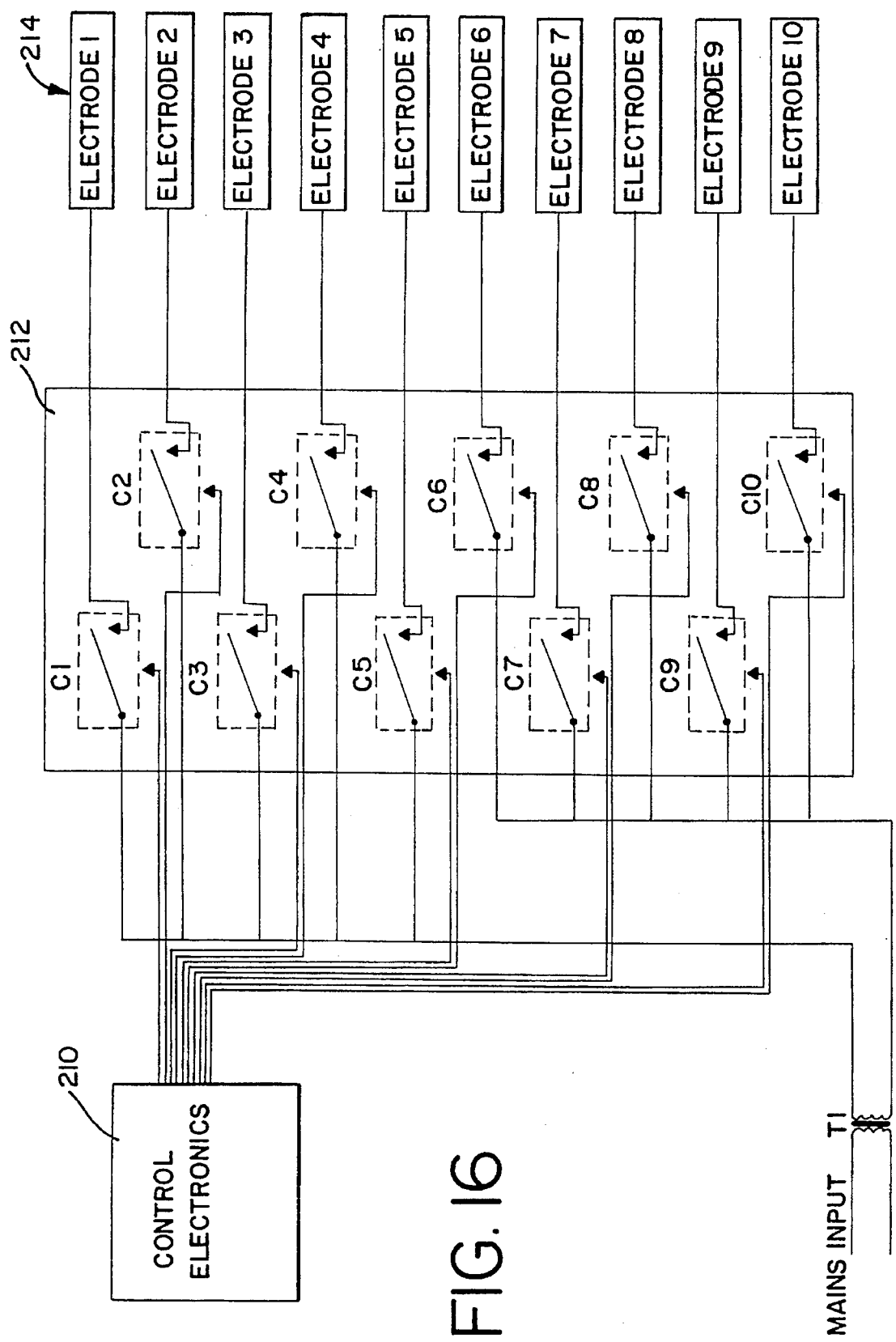
FIG. 16 illustrates an AC wide area deterrent device.

An alternative wide area deterrent device is illustrated, in block diagram form, in FIG. 16. This is an AC deterrent device which is configured such that alternating electric fields are set up between pairs of active electrodes using the seawater as a load. Control electronics 210 provide drive and sequencing outputs to fire the electrodes 1 to 10 through electrode driver circuitry 212 constituted by contacts C1 to C10.

The control electronics 210 first closes contacts C1 and C6 to allow a complete AC wave cycle through into the seawater load. In a preferred firing sequence, the contacts C1 and C6 are opened when the AC wave cycle is complete. After a predetermined delay (normally a full AC wave cycle delay is used), the contacts C2 and C7 are closed to allow a complete AC wave cycle through into the seawater load to set up an electric field between electrodes 2 and 7. This sequence is repeated for all the contacts C3 to C10 in pairs utilising the following sequence:

C1 and C8
C2 and C7
C3 and C8
C4 and C9
C5 and C10 whereafter the complete firing sequence is repeated. The resultant waveform is illustrated in FIG. 18. This sequence of firing of the electrodes 214 causes alternating electric fields to be generated in the seawater load between the two electrodes which are on at the time.

FIG. 17 illustrates, in block diagram form, a preferred electrode wiring configuration for a cable for the device of FIG. 16.

Figure 19:
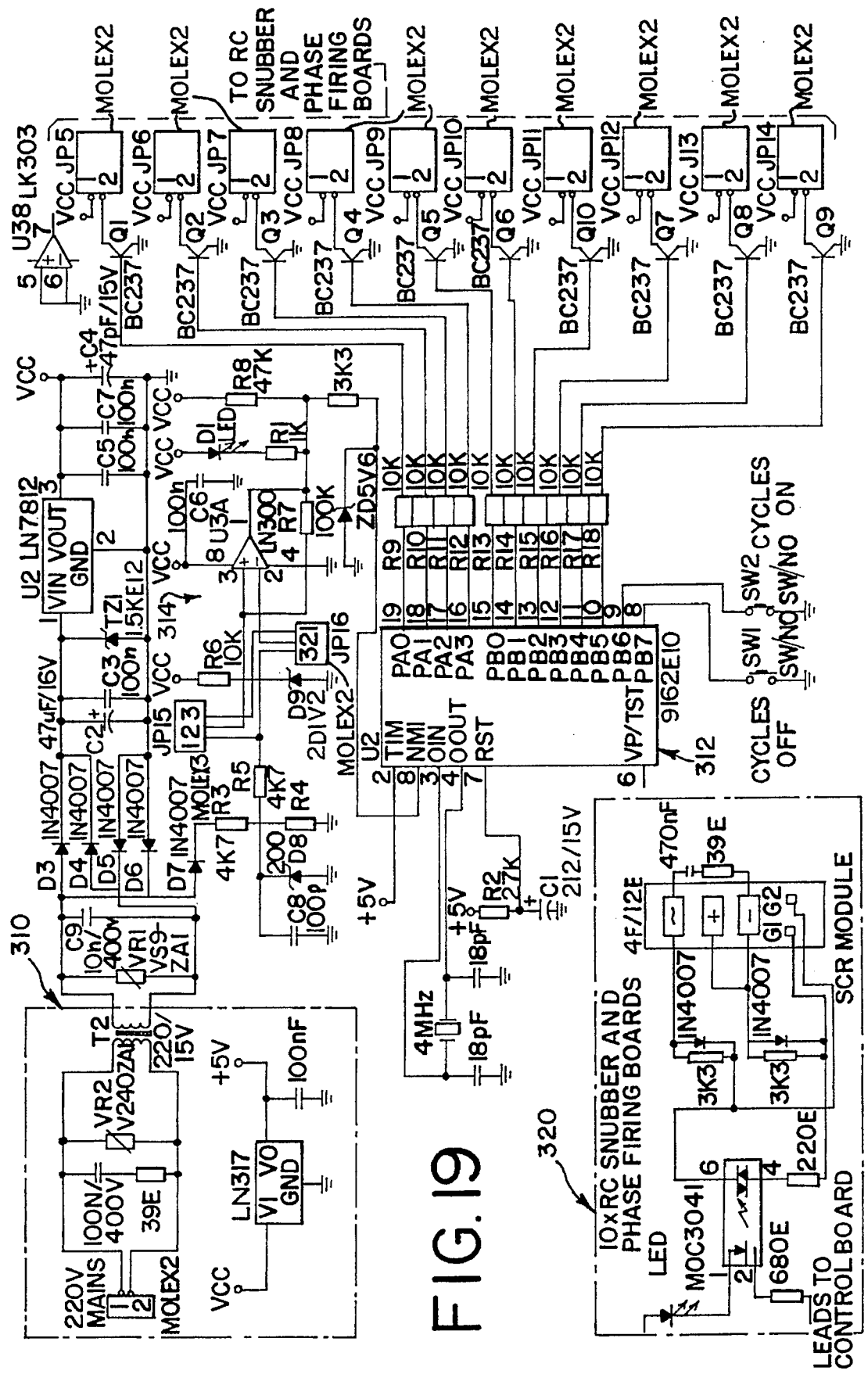
FIG. 19 shows an embodiment of the AC wide area deterrent device of FIG. 16 in greater detail.

An embodiment of the AC wide area deterrent device of FIG. 16 is illustrated in greater detail in the circuit diagram of FIG. 19. This circuit includes a power supply 310 and control circuitry 312 including an ST62E10 microcontroller. The electrode driver circuitry 320 is fired by switching circuitry including a zero crossing detector and SCR pre-driver stages. This device was developed for testing purposes and incorporates a large number of programmable elements to allow frequent reconfiguration.

The power supply consists of a 220 V to 15 V stepdown transformer which is rectified by diodes D3 to D6 and filtered by a capacitor C2. The resultant DC voltage is regulated by an LM7812 integrated circuit device U2 and the power required by the microcontroller is provided an LM317 regulator.

The microcontroller is an ST62E10 IC device which is programable so that any SCR firing configuration is achievable. The microcontroller fires in any order or at any phase, any of the transistors Q1 to Q10, which, in turn, drive opto-isolators constituted by MOC3041 integrated circuit devices to fire the SCR pre-driver stages.

A zero crossing detector which consists of an LM393 integrated circuit device U3 provides the ST62E10 microcontroller with the exact point in time at which the AC waveform crosses through the zero voltage point. Depending on its setting, the microcontroller fires the next SCR at the zero crossing point (to give the waveform illustrated in FIG. 18).

As an alternative, it is possible for the microcontroller to be programmed for phase firing to fire the SCR module half way through the phase in order to achieve a fast rising edge in the waveform. This gives the waveform illustrated in FIG. 20.

Figure 21:
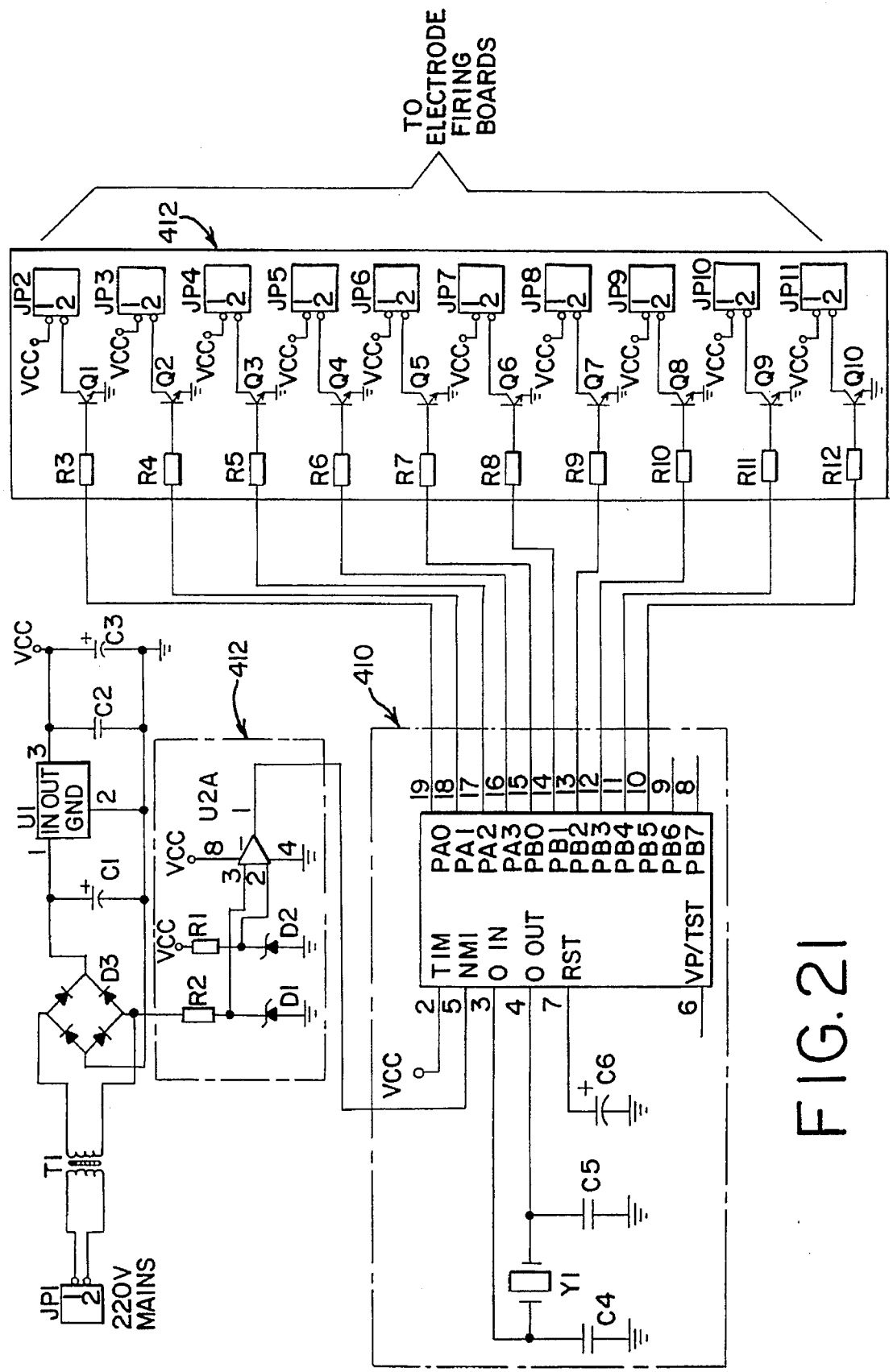
FIG. 21 is a circuit diagram which illustrates control circuitry for the devices of FIGS. 16 and 19.

The circuit diagrams of FIGS. 21 and 22 illustrate aspects of the devices of FIGS. 16 and 19.

In FIG. 21, an isolation transformer T1 provides a rectified power supply to the control electronics 410. A zero crossing detector 412 signals a microcontroller U3 forming part of the control electronics 410 at the zero crossing point of the AC waveform. The microcontroller U3 either fires the next appropriate pair of electrodes to allow a complete sine wave through into the seawater load or delays for a predetermined period of time to generate a phase-fired pulse in the seawater load.

A pre-driver stage 412 includes a plurality of transistors Q1 to Q10 which are driven by the microcontroller U3 in turn to drive the electrode driver circuity across optically coupled diacs 414 as is illustrated in FIG. 22.

FIG. 22 illustrates one pair of simultaneously fired electrodes 418 and 420 each with its corresponding electrode driver circuitry. When control signals from the transistors Q1 to Q10 (FIG. 21) are applied to the driver inputs 422 and 424 and signals are present at both inputs, the optically coupled diacs 414 and 416 both switch on to cause the associated SCRs Q1 or Q2 and Q3 or Q4 to be on. This will allow current flow between the electrodes 418 and 420 through the seawater load. Current flow will be in one direction for the first half of the AC sine wave and reverse direction for the second half of the AC sine wave thereby causing an alternating electric field to be generated between the electrodes 418 and 420. This sequence is repeated for all 10 of the electrodes.

We claim:

1. A method of controlling aquatic animals in a body of water, said method comprising the steps of:

immersing a first and a second electrode in the body of water; and creating an electric field between the first and second electrodes by passing a pulsed electrical current between the first and second electrodes thereby to repel aquatic animals from the vicinity of the first and second electrodes, the pulses of the pulsed electrical current having a duration of between 0.1 and 200 ms, a repetition rate of between 1 and 60 Hz, and a rise time, of each pulse, that is less than 0.001 µs; and the electrical current having a field strength in the body of water at a distance of 1 m, of 1 to 10 Vm$^{-1}$ from the vicinity of the first and second electrodes.

2. A method of controlling aquatic animals according to claim 1 including the steps of:

applying a direct current (DC) electrical current to the first and second electrodes; and reversing the polarity of the pulses periodically by switching the polarity of said direct current (DC) electrical current applied to the first and second electrodes.

3. A method of controlling aquatic animals according to claim 2 in which the polarity of the pulses is reversed after a predetermined number of pulses of each polarity.

4. A method of controlling aquatic animals according to claim 3, including the step of:

generating the pulses in pulse trains each comprising a plurality of pulses with each pulse having a duration of between 0.1 and 2 ms, the pulses in each pulse train being spaced at intervals of between 1 and 30 ms, and the pulse trains are repeated at intervals of between 100 and 1000 ms; and wherein said controlled aquatic animals comprise animals of the sub-group Elasmobranchii, such as sharks.

5. A method of controlling aquatic animals according to claim 4 in which each pulse in a pulse train has a duration of 2 ms, the pulses in each pulse train being spaced at intervals of 20 ms, and the pulse trains being repeated at a frequency of between 2 and 5 Hz.

6. A method of controlling aquatic animals according to claim 4 in which the polarity of successive individual pulses in each pulse train is reversed.

7. A method of controlling aquatic animals according to claim 4 in which the polarity of successive pulse trains is reversed.

8. A method of controlling aquatic animals according to claim 1 in which a plurality of first and second electrodes are immersed in the body of water in a predetermined configuration, the pulses being applied to selected pairs or groups of electrodes in a predetermined sequence for the resulting electrical field to be moved about within the body of water in a predetermined manner.

9. A method of controlling aquatic animals according to claim 1 in which a plurality of first and second electrodes are immersed in the body of water in a predetermined configuration, the pulses being applied to selected pairs or groups of electrodes randomly for the resulting electrical field to be moved about within the body of water in a random manner.

10. Apparatus for controlling aquatic animals in a body of water, said apparatus comprising:

a power supply;

a first electrode and a second electrode for immersion in a body of water;

first controllable switch means for connecting the first and second electrodes selectively to an output of the power supply in response to control signals; and control means arranged to provide the control signals to the first controllable switch means for the first controllable switch means to apply electrical pulses to the first and second electrodes, the pulses having a duration of between 0.1 and 200 ms, a repetition rate of between 1 and 60 Hz and a field strength in the body of water, at a distance of 1 m of 1 to 10 $Vm^{-1}$, thereby to repel aquatic animals from the vicinity of the first and second electrodes.

11. Apparatus according to claim 10 in which the pulses have an amplitude of between 24 and 72 Volts.

12. Apparatus according to claim 10 in which the power supply is a DC power supply.

13. Apparatus according to claim 10 including second controllable switch means responsive to polarity control signals from the control means to reverse the polarity of the pulses applied to the first and second electrodes periodically.

14. Apparatus according to claim 13 in which the first and second controllable switch means comprise solid state switch elements such as transistors, triacs, or the like.

15. Apparatus according to claim 13 in which the first and second controllable switch means being controlled synchronously so that the reverse of the polarity of the pulses occurs simultaneously with the generation thereof.

16. Apparatus according to claim 10 including current limiting means associated with the first controllable switch means for controlling the current drawn from the power supply during use.

17. Apparatus according to claim 10 including a plurality of first and second electrodes arranged in a predetermined configuration, the control means operating to control the first controllable switch means so that the electrical pulses are applied to selected pairs or groups of electrodes in a predetermined sequence for the resulting electrical field to be moved about within the body of water in a predetermined manner.

18. Apparatus according to claim 10 including a plurality of first and second electrodes arranged in a predetermined configuration, the control means operating to control the first controllable switch means so that the electrical pulses are applied to selected pairs or groups of electrodes randomly for the resulting electrical field to be moved about within the body of water in a random manner.

19. Apparatus according to claim 10 which is portable and adapted to be worn by a swimmer or diver, the power supply being a battery supply.

20. Apparatus according to claim 19 in which electrical circuitry associated with the power supply, the first controllable switch means and the control means is housed in a waterproof casing.

21. Apparatus according to claim 20 including a sensor adapted to provide an output when the casing is submerged, the control means being responsive to the output to actuate the apparatus automatically.

22. Apparatus according to claim 20 including a sensor adapted to provide an output when the casing is removed from the water, the control means being responsive to the output to deactivate the apparatus automatically on receipt thereof.

23. Apparatus according to claim 10 in which the pulses are generated in pulse trains each comprising a plurality of pulses, with each pulse having a duration of between 0.1 and 3 ms, the pulses in each pulse train being spaced at intervals of between 1 and 30 ms, and the pulse trains are repeated at intervals of between 100 and 1000 ms; and wherein said controlled aquatic animals comprise aquatic animals of the sub-group Elasmobranchii, such as sharks.

24. Apparatus according to claim 23 in which each pulse in a pulse train has a duration of 2 ms, the pulses in each train are spaced at intervals of 20 ms and the pulse trains are repeated at a frequency of between 2 and 5 Hz.

* * * * *

UNITED STATES PATENT AND TRADEMARK OFFICE
CERTIFICATE OF CORRECTION

PATENT NO. : 5,566,643
DATED : October 22, 1996
INVENTOR(S) : Charter et al.

It is certified that error appears in the above-identified patent and that said Letters Patent is hereby corrected as shown below:

In Claim 4, line 9, after "comprise" insert --aquatic--.

Signed and Sealed this

Twenty-eighth Day of July, 1998

Attest:

BRUCE LEHMAN

Attesting Officer     Commissioner of Patents and Trademarks